US012760591B2

(12) United States Patent
Gill et al.

(10) Patent No.: US 12,760,591 B2
(45) **Date of Patent: *Oct. 13, 2026**

(54) LIGHTWEIGHT FLOOD PANEL AND FLOOD BARRIER SYSTEM USING SAME

(71) Applicant: BOYNTON BEACH PANEL INC., Lake Worth, FL (US)

(72) Inventors: Brandan Gill, Boynton Beach, FL (US); Tiffany Largey, Lake Worth, FL (US)

(73) Assignee: BOYNTON BEACH PANEL INC., Lake Worth, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/435,000

(22) Filed: Dec. 29, 2025

(65) Prior Publication Data

US 2026/0125921 A1 May 7, 2026

Related U.S. Application Data

(63) Continuation of application No. 19/415,369, filed on Dec. 10, 2025, which is a continuation-in-part of application No. 19/242,450, filed on Jun. 18, 2025.

(60) Provisional application No. 63/661,374, filed on Jun. 18, 2024.

(51) Int. Cl.

| | |
|---|---|
| ***E02B 7/00*** | (2006.01) |
| ***E04H 9/14*** | (2006.01) |
| ***E06B 9/00*** | (2006.01) |

(52) U.S. Cl.

CPC ............... *E06B 9/00* (2013.01); *E04H 9/145* (2013.01); *E06B 2009/007* (2013.01)

(58) Field of Classification Search

CPC ... E04H 9/145; E06B 2009/007; E02B 7/005; E02B 3/106; E02B 3/102

See application file for complete search history.

(56) References Cited

U.S. PATENT DOCUMENTS

| | | | | |
|---|---|---|---|---|
| 5,333,970 | A | 8/1994 | Heselden | |
| 6,042,301 | A | 3/2000 | Sovran | |
| 6,450,733 | B1 | 9/2002 | Krill et al. | |
| 6,623,209 | B1 * | 9/2003 | Waters, Jr. | E02B 7/44 405/100 |
| 7,364,385 | B1 | 4/2008 | Luke | |
| 9,085,864 | B2 | 7/2015 | Ortiz | |
| 9,885,162 | B1 | 2/2018 | Munz | |
| 10,267,010 | B2 | 4/2019 | Thomas et al. | |
| 11,035,141 | B1 | 6/2021 | Shorten | |
| 11,255,100 | B1 | 2/2022 | Hughes | |

(Continued)

*Primary Examiner* — Sean D Andrish

(74) *Attorney, Agent, or Firm* — The Concept Law Group, PA; Scott D. Smiley; Scott M. Garrett

(57) ABSTRACT

A lightweight flood panel includes a frame defining a central void, a lightweight core (e.g., hexagonal cell honeycomb or fiber-reinforced closed cell foam) disposed in the void, and fiberglass sides covering the assembly. The frame provides perimeter support and includes holes for fastening units. A method of manufacture involves adhesively assembling the components under vacuum. A flood barrier system uses multiple such panels secured in series with gaskets and fastening units, each fastening unit including a bolt, adjustment knob, washer, and rivet nut or anchor for water-tight installation across gaps between structures to resist hydrostatic pressure and impacts.

18 Claims, 20 Drawing Sheets

(56) References Cited

U.S. PATENT DOCUMENTS

| | | | |
|---|---|---|---|
| 2006/0151770 | A1 | 7/2006 | Payne |
| 2008/0245009 | A1 | 10/2008 | Temple et al. |
| 2010/0193512 | A1 | 8/2010 | Heselden |
| 2014/0369760 | A1 | 12/2014 | Venton |
| 2015/0204040 | A1 | 7/2015 | Knezevich et al. |
| 2016/0244930 | A1 | 8/2016 | Burgeois |
| 2017/0218586 | A1 | 8/2017 | Knezevich et al. |
| 2018/0214929 | A1 | 8/2018 | Wendeler-Goeggelmann |
| 2019/0211521 | A1 | 7/2019 | Waters, Jr. |
| 2020/0040595 | A1 | 2/2020 | Cohen |
| 2021/0285176 | A1* | 9/2021 | McCutchen ............ E02B 3/126 |
| 2023/0292685 | A1 | 9/2023 | Schwammberger |
| 2024/0026732 | A1 | 1/2024 | Mitchell |
| 2026/0110212 | A1* | 4/2026 | Gill ........................... E06B 9/00 |

* cited by examiner

1000

LIGHTWEIGHT FLOOD PANEL AND FLOOD BARRIER SYSTEM USING SAME

CROSS REFERENCE

This application is a continuation of U.S. patent application Ser. No. 19/415,369, filed Dec. 10, 2025, which is a continuation-in-part of U.S. application Ser. No. 19/242,450, filed Jun. 18, 2025, and through that application claims the benefit of U.S. Provisional Patent Application No. 63/661,374, filed Jun. 18, 2024, the entireties of each of which are hereby incorporated by reference.

FIELD OF THE INVENTION

The present invention relates generally to flood barrier systems, and, more particularly, relates to a panel construction for panels used to create a flood barrier in which the internal material of the panel is lightweight and yet stiff enough to withstand the loads created by both hydrostatic pressure due to flood water, as well as being impact resistant.

BACKGROUND OF THE INVENTION

Flood barrier systems are used to protect buildings in flood prone regions from water intrusion due to weather events and other situations where buildings are likely to be subject to elevated water levels. Flood barriers can be implemented in a variety of forms, including earthen barriers and sandbags. While these forms of barriers may work for some application, they are not so suited for more applications where such barriers are impractical. For example, buildings in urban locations require a different approach, and led to the development of panel barrier systems. A panel barrier is a series of vertically mounted water-impermeable panels that use water resistant gaskets between the panel and concrete surfacing, between adjacent panel, and between the panels and the building side. Thus, these flood panels can be erected similar to a fence around a building that provides a barrier to water. In some applications panels can be mounted across doors and other openings though which water could enter the building. Although very effective, the panels must be designed to withstand both the hydrostatic pressure of flood waters on one side of the flood barrier system, and to resist impact or sudden changes in pressure due to waves, or even debris carried in the flood water. At the same time, the size of the panels is selected as a balance between handleability and ease of setup/installation. That is, for example, narrow panels are easier to handle, being lighter than wider panels, but then more mounting hardware is needed over a given distance, which means more time is needed to install narrow panels over wider panels. However, wider panels are heavier and more difficult to handle and move. Therefore, a need exists to overcome the problems with the prior art as discussed above.

SUMMARY

In accordance with some embodiments of the inventive disclosure, there is provided a lightweight flood panel for a flood barrier system that includes a frame defining a central void, the frame extending around a perimeter of the lightweight flood panel and configured to provide structural support. There is a lightweight core disposed within the central void of the frame between a first side and a second side, each formed of fiberglass comprising woven glass fibers in a cured resin. The first side and the second side being substantially parallel and spaced apart to cover the frame and the lightweight core, defining a thickness of the lightweight flood panel. The lightweight core comprises a cell core having a plurality of regularly shaped cells bounded by walls extending through a thickness of the lightweight core, the cells being voids, and the lightweight core further comprising skins on opposing sides of the cell core to cover the cells.

In accordance with a further feature, the cells are hexagonal in shape, forming a honeycomb pattern.

In accordance with a further feature, the walls of the cell core are formed of a polymeric material.

In accordance with a further feature, the polymeric material is polypropylene.

In accordance with a further feature, the skins each comprise an inner plastic film bonded to the cell core and an outer non-woven polyester layer bonded to the inner plastic film.

In accordance with a further feature, each cell has an opening size from one wall to an opposing wall of about eight millimeters to two inches.

In accordance with a further feature, the frame is formed of a foam material having a density of about 80 to 130 $kg/m^3$.

In accordance with a further feature, the frame is formed of metal tubing.

In accordance with a further feature, the frame has a width of about six inches extending inward from edges of the lightweight flood panel.

In accordance with a further feature, there is also a plurality of holes drilled through the frame and the first and second sides adjacent edges of the lightweight flood panel for receiving fastening units.

In accordance with some embodiments of the inventive disclosure, there is provided a lightweight flood panel for a flood barrier system that includes a frame defining a central void, the frame extending around a perimeter of the lightweight flood panel and configured to provide structural support. There is a lightweight core disposed within the central void of the frame. There is also a first side and a second side, each formed of fiberglass comprising woven glass fibers in a cured resin, the first side and the second side being substantially parallel and spaced apart to cover the frame and the lightweight core, defining a thickness of the lightweight flood panel. The lightweight core comprises a laminate foam core formed of a fiber-reinforced closed cell foam, with layers of woven fiberglass distributed throughout the closed cell foam and oriented parallel to the first side and the second side. In accordance with a further feature, the closed cell foam is a polyurethane foam.

In accordance with a further feature, the fiberglass is continuously distributed throughout the closed cell foam.

In accordance with a further feature, the lightweight core further comprises skins on opposing sides of the laminate foam core.

In accordance with a further feature, the frame is formed of a foam material having a density of about 80 to 130 $kg/m^3$.

In accordance with a further feature, the frame is formed of metal tubing.

In accordance with a further feature, the frame has a width of about six inches extending inward from edges of the lightweight flood panel.

In accordance with a further feature, there is also a plurality of holes drilled through the frame and the first and second sides adjacent edges of the lightweight flood panel for receiving fastening units.

In accordance with some embodiments of the inventive disclosure, there is provided a method of making a lightweight flood panel for a flood barrier system that includes providing a frame defining a central void and positioning a lightweight core within the central void of the frame. The method also includes applying an adhesive resin to inner surfaces of a first side and a second side. The first side and the second side are each formed of fiberglass comprising woven glass fibers in a cured resin. The method includes placing the first side and the second side over the frame and the lightweight core in a sandwich arrangement and placing the sandwich arrangement in a vacuum bag. The method further includes adding additional adhesive resin into the vacuum bag to fill edges and gaps, and applying a vacuum to an interior of the vacuum bag and allowing the adhesive resin and the additional adhesive resin to cure, forming a cured panel assembly. The method also includes removing the cured panel assembly from the vacuum bag, and finishing edges of the cured panel assembly.

In accordance with a further feature, the method also includes drilling a plurality of holes through the frame and the first and second sides adjacent edges of the lightweight flood panel for receiving fastening units.

Although the invention is illustrated and described herein as embodied in a fabric flood panel, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1A:
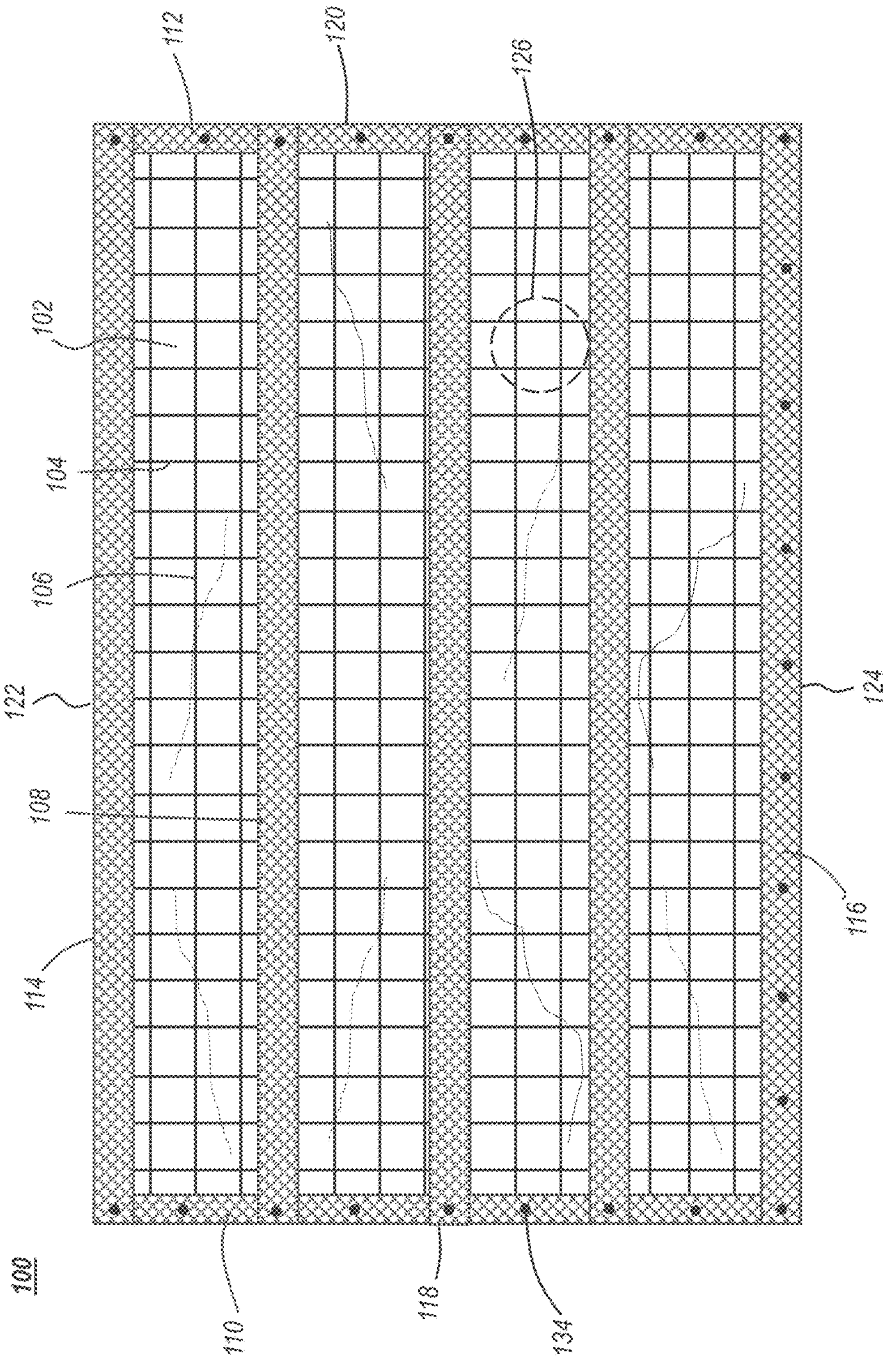
FIG. 1A is an elevational view of a fabric panel for a flood barrier system, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1A is an elevational view of a fabric panel 100 for a flood barrier system, in accordance with some embodiments. The fabric panel 100 includes a base sheet 102 of material that is water-impermeable. The fabric panel 100 has a first side (e.g. the side shown here) and a second, opposite, side. The fabric panel 100 also has a first side edge 118, and second side edge 120, a top edge 122, and a bottom edge 124. In general, the fabric panel 100 has a rectangular shape. In some embodiments the fabric panel can have a width from the first side edge 118 to the second side edge 120 of about eight feet, and a height, from the top edge 122 to the bottom edge 124, of about five feet. Of course, different sizes can be used as dictated by particular applications. The fabric panel 100 is intended to span between opposite sides of a throughway, such as, for example, an entrance to a building, or a space between buildings. It is also contemplated that the fabric panel 100 could be used in a series of panels forming an extended barrier wall around a structure. The first and second side edges 118, 120 and the bottom edge 124 are configured to be disposed in respective vertical and horizontal barrier structures. The barrier structures are anchored to surfaces in a water-tight manner, and hold the respective edges of the fabric panel in them in a water-tight manner, thereby creating a flood barrier.

The base sheet 102 is made of a water-impermeable material, such as, for example, polycarbonate. In some embodiments the base sheet can be made of a combination of polyvinyl chloride and poly-paraphenylene terephthalamide fibers. Poly-paraphenylene terephthalamide is known by the trade name KEVLAR, and is a poly-aramid fiber that has good resistance to penetration and cutting, which can resist rupture or tearing of the fabric panel due in response to impact from debris carried by flood waters. The fabric panel 100 can include a wire mesh to provide additional strength and impact resistance. In some embodiments the wire mesh can be a rectangular wire mesh that includes vertical wire lines 104 and horizontal wire lines 106. Each of the wire lines includes at least one wire, and can include a plurality of wires bundled together along the wire line. Thus, as used here, the term "wire line" means at least one wire that forms a line. The wires are made of metal and when more than one wire is present in a wire line, the wires can run parallel to each other in a bundle, or they can be woven or braided together. In some embodiments the wires are made of titanium to provide good strength and low weight. The wire mesh can be fixed onto one or both sides of the fabric panel 100. In some embodiments the wire mesh is disposed only on the "wet" side of the fabric panel, which is the side intended to face the water during a flood event. It is contemplated that in some embodiments a non-rectangular wire mesh can be used, such as, for example, a hexagonal wire mesh. It is further contemplated that, where there is wire mesh on both sides of the base sheet 102, the wire mesh on one side can have a different configuration or arrangement, or the same arrangement as the wire mesh on the opposite side of the base sheet 102. In addition to adding strength to the base sheet, the wire mesh mitigates damage to the fabric panel in the event of a tear or rupture in the base sheet due to debris impact, preventing the tear or rupture from opening further than the local cell formed by the wire mesh in which the tear or rupture occurs. A "cell" being a region of the base sheet surrounded by the wire or wires of the wire mesh.

Figure 1B:
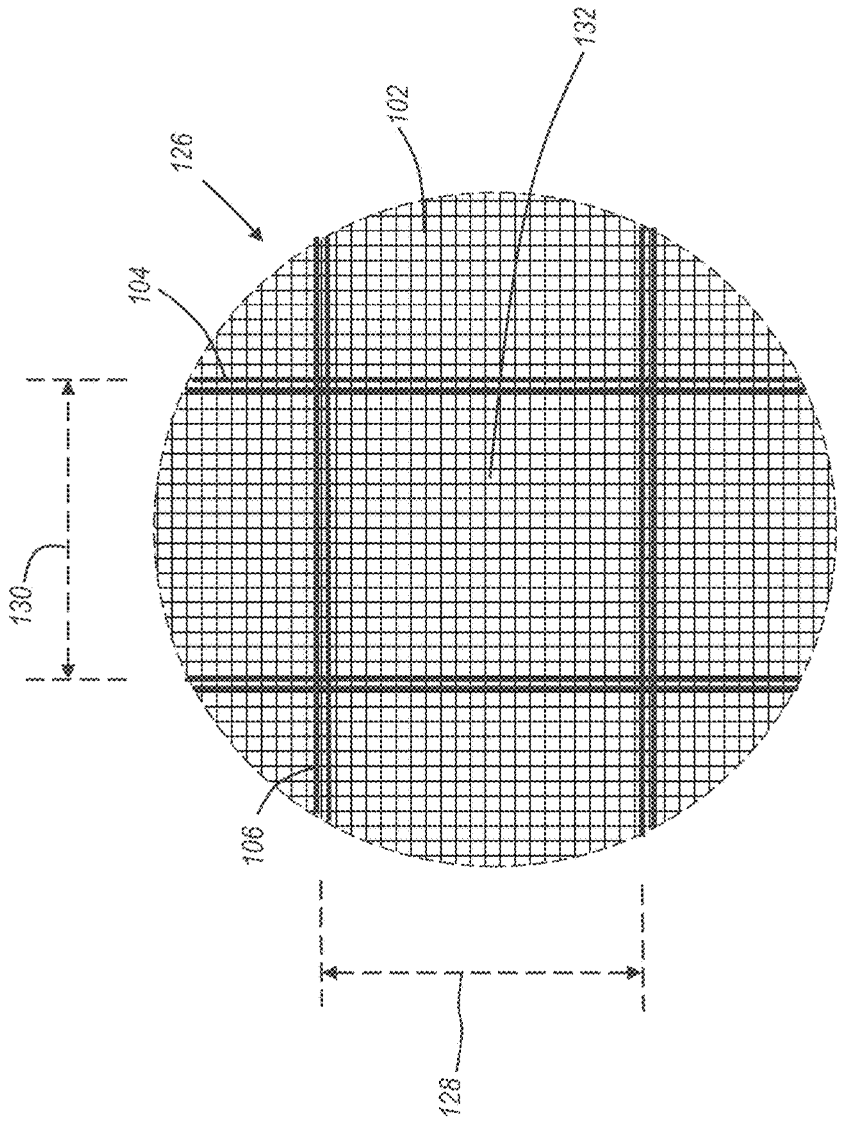
FIG. 1B shows a detail of the construction of the fabric panel for a flood barrier system, in accordance with some embodiments.

Detail 126 of FIG. 1A is shown in FIG. 1B, including vertical wire lines 104 and horizontal wire lines 106. Here, the vertical and horizontal wire lines 104, 106 include multiple wires bundled together in each line 104, 106. A cell 132 is shown as a region of the base sheet 102 bounded by wire lines on all sides. When the wire mesh is a rectangular wire mesh, the horizontal spacing 128 and the vertical spacing 130 between wire lines 104, 106 can be one half inch to four inches in some embodiments.

In addition, the wire mesh, the fabric panel 100 can include belting lines of strap material, which can be, for example, woven nylon. There is a first side belting line 110 along the first side edge 118, a second side belting line 112 along the second side edge 120, a top belting line 114 along the top edge 122, and a bottom belting line 116 along the bottom edge 124. There can also be a plurality of horizontal belting lines 108 that run from the first side edge 118 to the second side edge 120. Along the side belting lines 110, 112 and the bottom belting line 116 there can be a plurality of reinforced openings through the belting line material and the base sheet to allow pass through of fasteners for holding the fabric sheet 100 in barrier structures. In some embodiments, the belting lines can have a width of two to three inches, and a horizontal spacing between the horizontal belting lines of five to fifteen inches. In general, the belting lines are fixed to the base sheet along their length, but in some embodiments the horizontal belting lines may only be fixed to the base sheet at the first and second side edges, allowing the horizontal belting lines to move relative to the base sheet between the side edges. As with the wire mesh, the belting line may be provided on one or both sides of the base sheet. In some embodiments the wire mesh and belting lines are provided on the "wet" side of the fabric panel. The horizontal belting lines 108 can add further resistance to damage from debris impact, as larger debris will impact the belting lines, and reduce the impact of the debris against the base sheet and wire mesh.

Figure 2A:
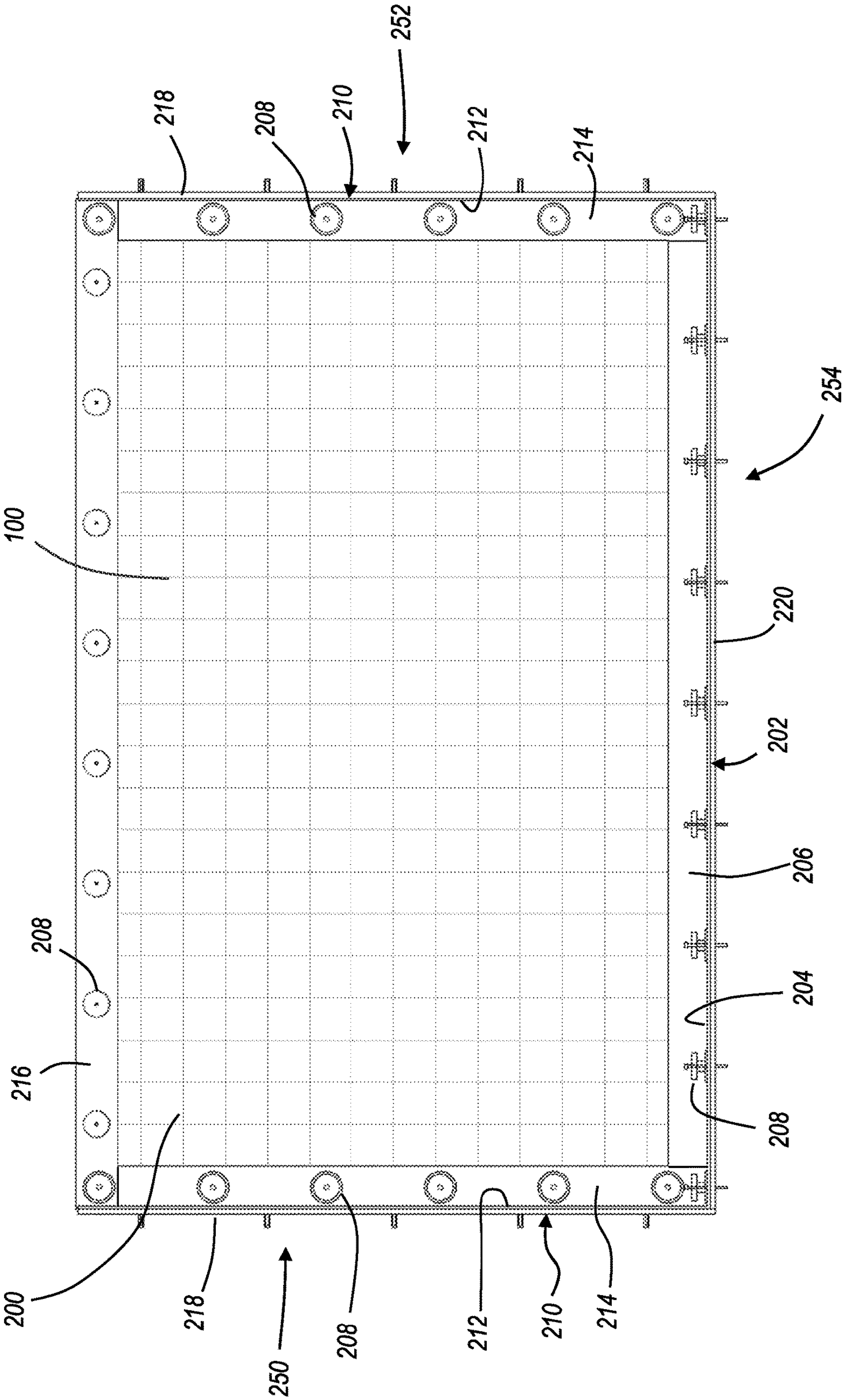
FIG. 2A shows an elevational view of a first side of a flood barrier system using a fabric panel, in accordance with some embodiments.
Figure 2B:
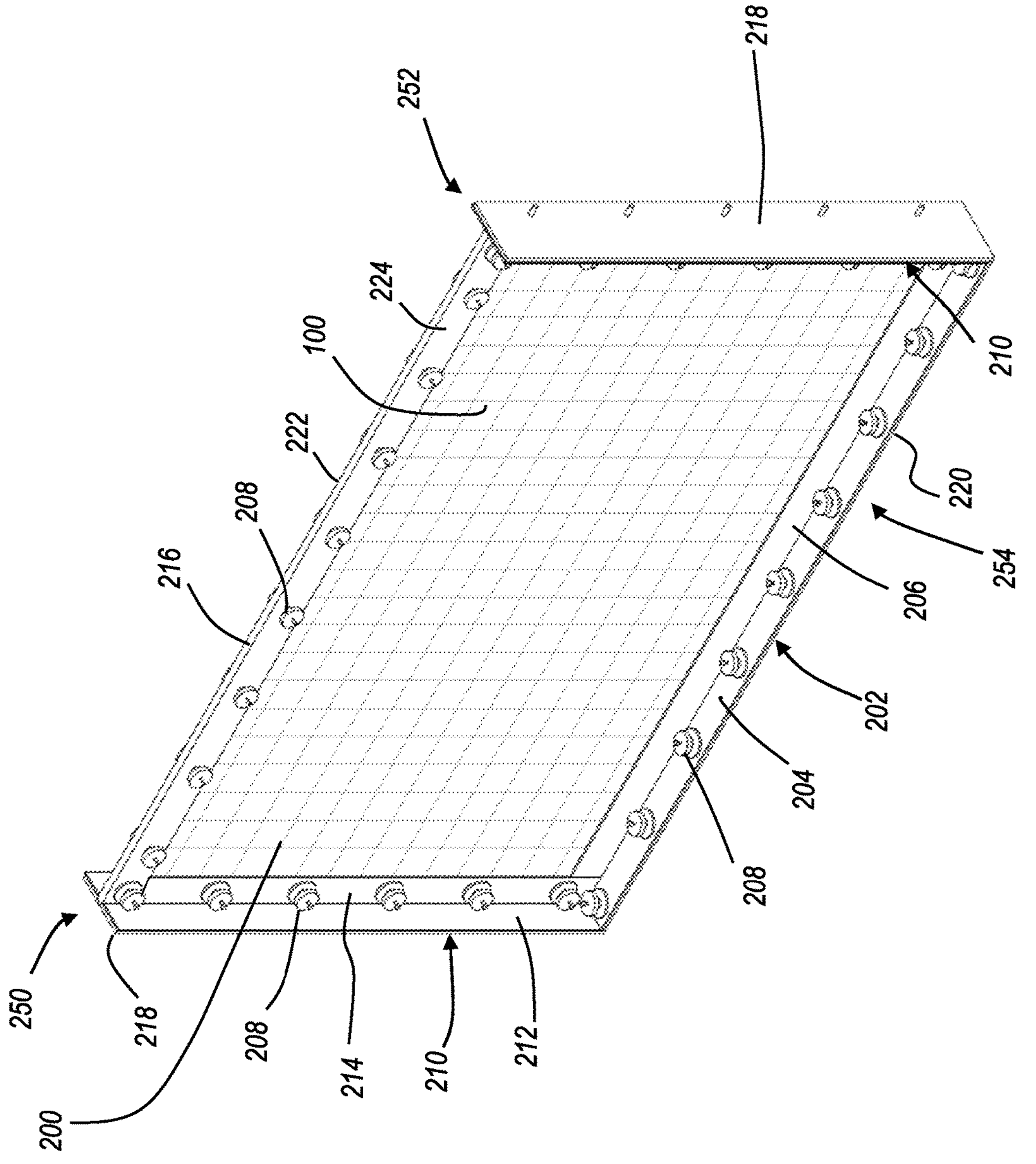
FIG. 2B shows a perspective view of the first side of the flood barrier system using a fabric panel, in accordance with some embodiments.
Figure 3A:
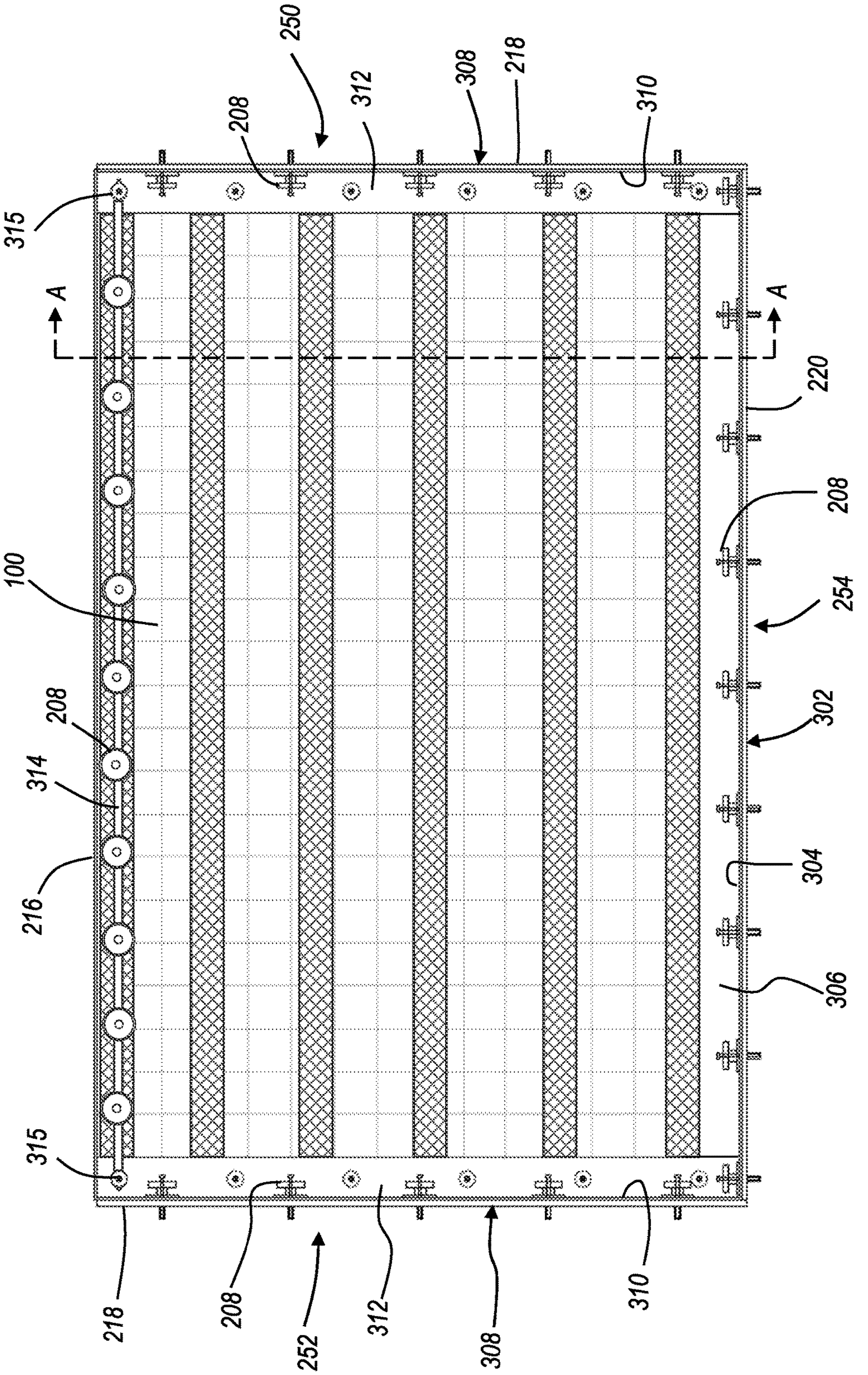
FIG. 3A shows an elevational view of a second side of a flood barrier system using a fabric panel, in accordance with some embodiments.
Figure 3B:
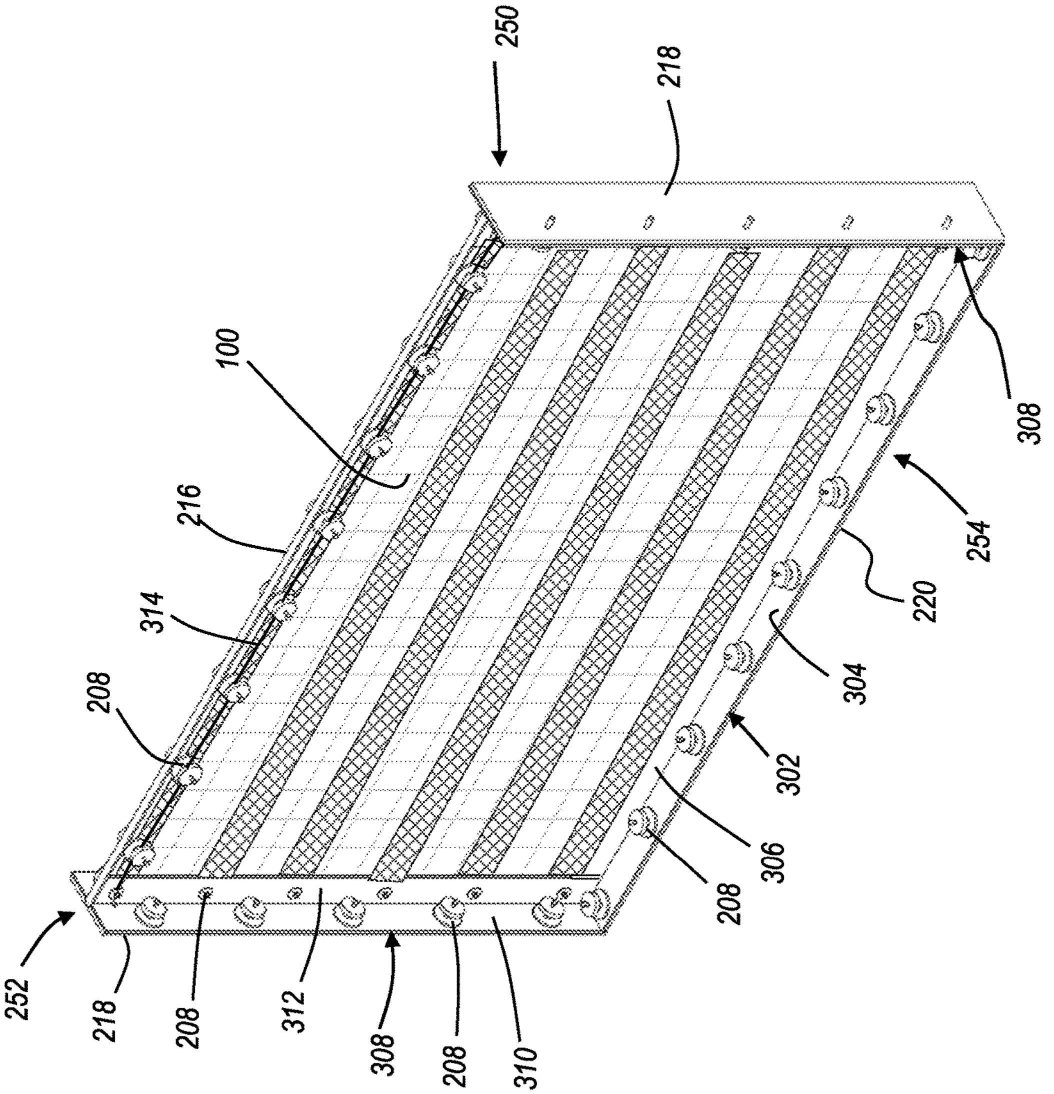
FIG. 3B shows a perspective view of the second side of the flood barrier system using a fabric panel, in accordance with some embodiments.

FIG. 2A shows an elevational view of a first side 200 of a flood barrier system using a fabric panel 100, in accordance with some embodiments. FIG. 2B shows the same side in a perspective view. The view of the fabric panel 100 here shows the opposite side from that of FIG. 1A, and it can be seen that there are no belting lines on the side of the fabric panel 100 shown here. The side shown here can be the "dry" side of the fabric panel barrier system, and it is not anticipated that there will be debris impact on the dry side of the barrier, so there is no need for the belting lines. Reference should also be made to FIGS. 3A, 3B, which show the opposite side of the barrier from FIGS. 2A, 2B. The fabric panel 100 is disposed at its side and bottom edges in barrier structures. In particular, the bottom edge of the fabric panel 100 is disposed in a horizontal barrier structure 254, the first side edge of the fabric panel 100 is disposed in a first vertical barrier structure 252, and the second side edge of the fabric panel is disposed in a second vertical barrier structure 250. The barrier structures 250, 252, 254 are configured to be anchored to a respective surface. In particular a cementitious surface, such as concrete, or similar construction materials. In particular the horizontal barrier structure 254 is configured to be anchored to a horizontal surface, such as concrete around or adjacent a building. The vertical barrier structures 250, 252 are configured to be anchored to vertical surfaces, such as exterior walls of a building or buildings. Each of the vertical barrier structures 250, 252 extend from an opposite end of the horizontal barrier structure 254.

In some embodiments the barrier structures 250, 252, 254 can be comprised of a pair of right-angle brackets that each have an anchoring portion for anchoring to their respective anchor surface, and a capture portion at a right-angle to the anchoring portion that opposes the capture portion of the opposing right-angle bracket of the respective barrier structure and holds an edge of the fabric panel therebetween. The right-angle brackets can be made of aluminum, or another sufficiently rigid material. For example, the horizontal barrier structure includes a first horizontal right-angle bracket 202, and a second horizontal right-angle bracket 302. Likewise, the first vertical barrier structure 252 and the second vertical barrier structure each include a first vertical right-angle bracket 210 and a second vertical right-angle bracket 308. The first horizontal right-angle bracket 202 includes an anchor portion 204 and a capture portion 206 and the second horizontal right-angle bracket 302 includes an anchor portion 304 and capture portion 306. The anchor portions 204, 304 and the capture portions 206, 306 provide a generally flat surface on each side of the respective portions 204, 304, 206, 306. The bottom side of the anchor portions 204, 304 bear against a bottom gasket 220. To anchor the horizontal right-angle brackets to the ground surface, there are a plurality of fastening units 208 which include a bolt that passes through the anchor portions 204, 304 and the gasket 220 and into a respective corresponding anchor disposed in the ground surface. The fastening units 208 can be tightened against the anchor in the ground surface to compress the gasket 220 and create a water-tight seal against the ground surface.

Similarly, each of the vertical right-angle brackets 210, 308 each have an anchor portion 212, 310 and a capture portion 214, 312, respectively. The anchor portions 212, 310 bear against a gasket 218 that is positioned between the anchor portion 212, 310 and the wall/surface to which the vertical right-angle brackets 210, 308 are anchored. Fastening units 208 are used to anchor the anchor portions 212, 310 to the wall/surface in the same manner as the horizontal right-angle brackets are anchored to the ground surface. It should be noted that in the context of anchoring, the term "surface" means the structure to which the bracket is being anchored, including the planar exterior surface as well as the material of the structure past the surface in which anchors are embedded to interface with the fastening units 208. The capture portions 214, 312 bear against the respective side edge of the fabric panel 100 and a gasket to capture and seal the fabric panel 100 between the capture portions 214, 312 of the opposing right-angle brackets 210, 308. The fastening units 208 used in the capture portions 204, 304, 212, 310 pass through both opposing capture portions (e.g. 204 and 304, and 212, and 310) as well as the fabric panel, such as through the reinforced openings 134.

In some embodiments a top cap 216 can be provided along the top edge 122 of the fabric panel. The top cap 216 is a rigid member having a horizontal portion 222 that extends over the top of the fabric panel 100, and a vertical portion 224 at a right-angle to the horizontal portion 222 that runs along the side of the fabric panel 100 adjacent the top edge 122. The top cap provides support and rigidity to the top of the fabric panel 100. Further, a cable 314 can be disposed on the opposite side of the fabric panel 100 from the vertical portion 224 of the top cap 216. The cable 314 extends across the entire width of the fabric panel along or adjacent to the top edge 122, and can have ends that are loops 315 to assist in hanging the fabric panel 100 during assembly of the flood barrier system.

Figure 5:
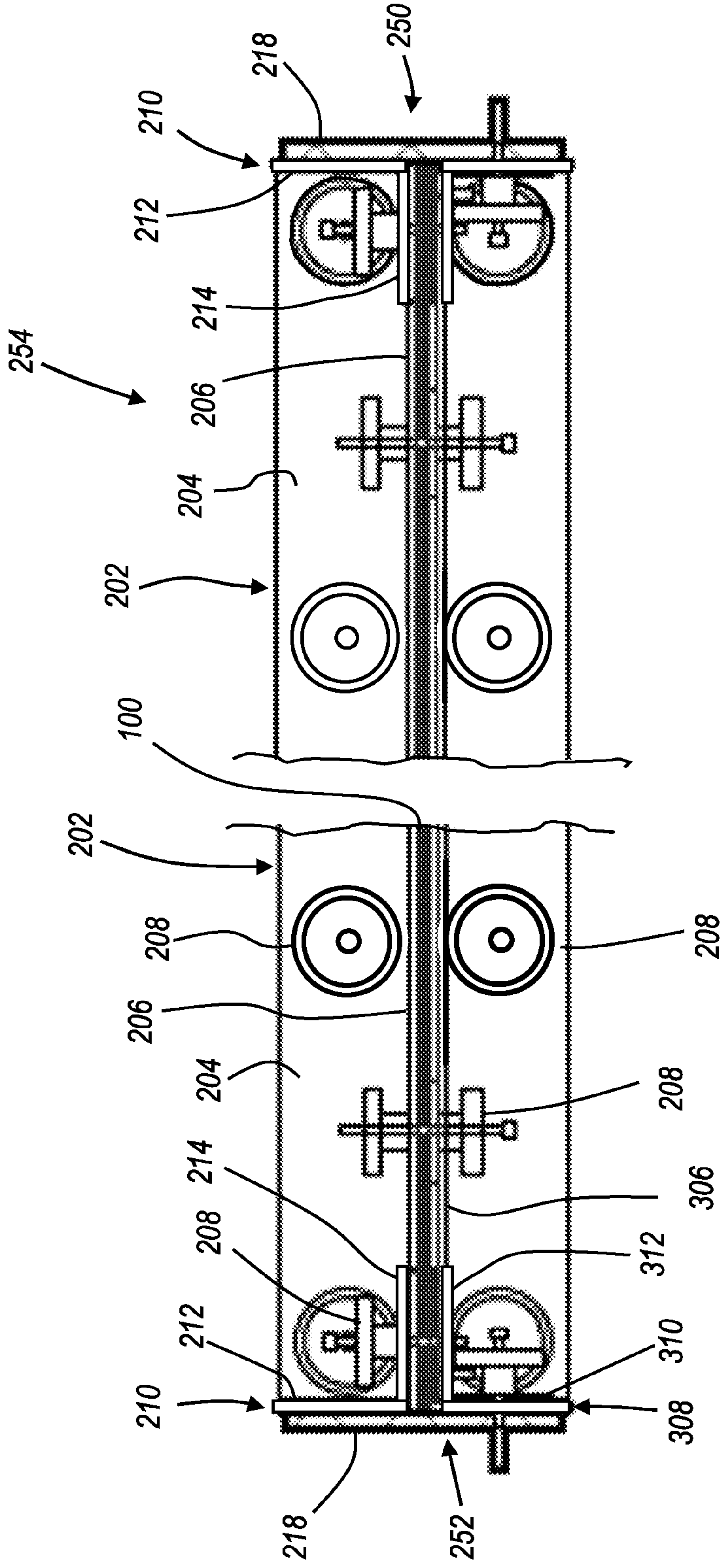
FIG. 5 shows a top view of the flood barrier system using a fabric panel, in accordance with some embodiments.
Figure 6:
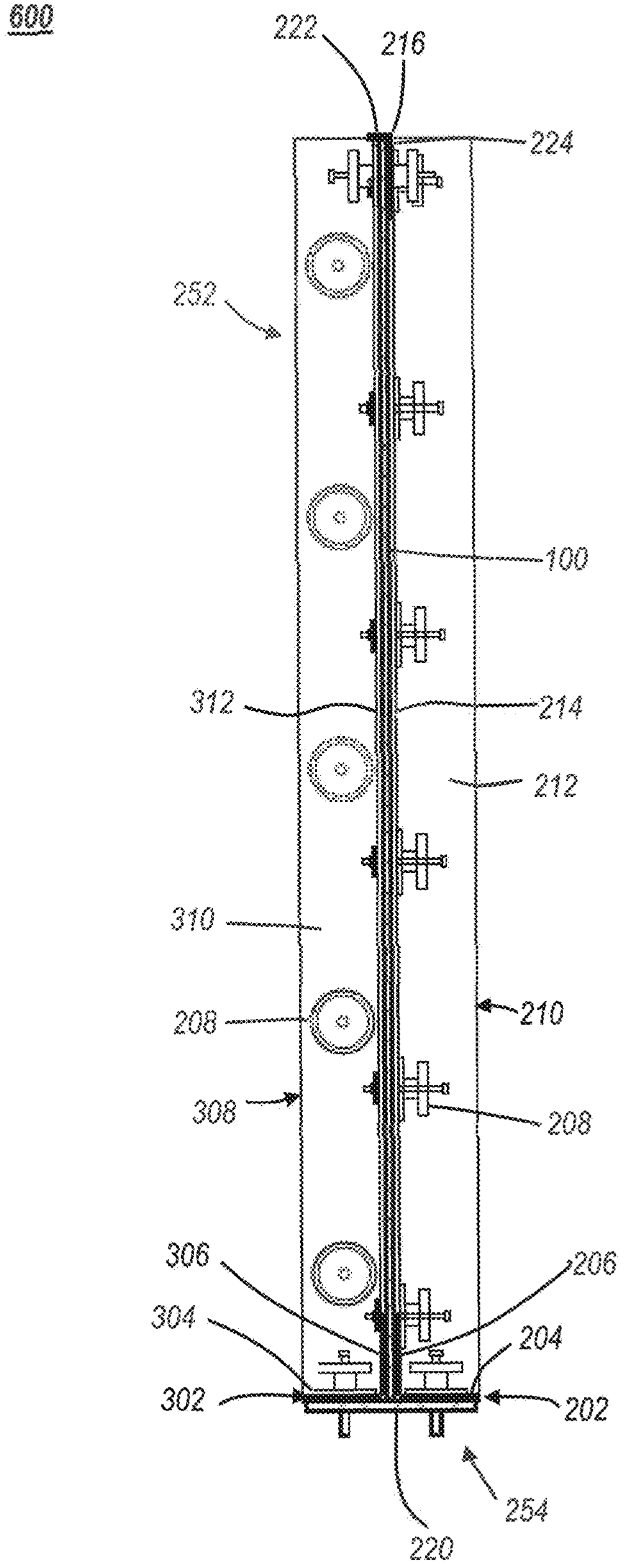
FIG. 6 shows side sectional view of the flood barrier system using a fabric panel, with the section taken centrally through the flood barrier system, in accordance with some embodiments.

FIG. 5 shows a top view of the flood barrier system using a fabric panel 100, in accordance with some embodiments. The horizontal barrier structure 254 is comprised of first and second horizontal right-angle brackets 202, 302, which has opposing capture portions 206, 306, between which the bottom edge of the fabric panel 100 is disposed and captured. The vertical right-angle brackets 210, 308 at each side of the barrier system are also shown, and it can be seen that the respective side edges of the fabric panel are captured between opposing capture portions 214, 312 of the vertical right-angle brackets 210, 308 at each side of the fabric panel 100. Fastening units 208 are used to both anchor the brackets to the respective surfaces, and to each other to capture the fabric panel 100 between their respective capture portions, as well as to attach the top cap 216 to the system. FIG. 6 shows a side sectional view of the flood barrier system using a fabric panel 100, with the section taken centrally through the flood barrier system, in accordance with some embodiments. As in FIG. 5, the various brackets 202, 320, 210, 308 are shown. The opposing capture portions 206, 306 of the horizontal angle brackets 202, 302 are shown with the bottom edge of the fabric panel captured therebetween. Likewise, the capture portions 214, 312 of the vertical angle brackets 210, 308 capture the side edge of the fabric panel therebetween. In general, the barrier structures 250, 252, and 254 are anchored to respective surfaces using a plurality of fastening units that mate with embedded anchors in the respective surfaces. These fastening units used for anchoring also compress respective gaskets between the angle brackets and the surfaces to form seals that prevent water egress. Similarly, the barrier structures capture the side and bottom edges of the fabric panel 100 in a water-tight manner. The fastening units 208 are also used to compress the capture portions of the opposing angle brackets together with the fabric panel edges between the capture portions.

Figure 4:
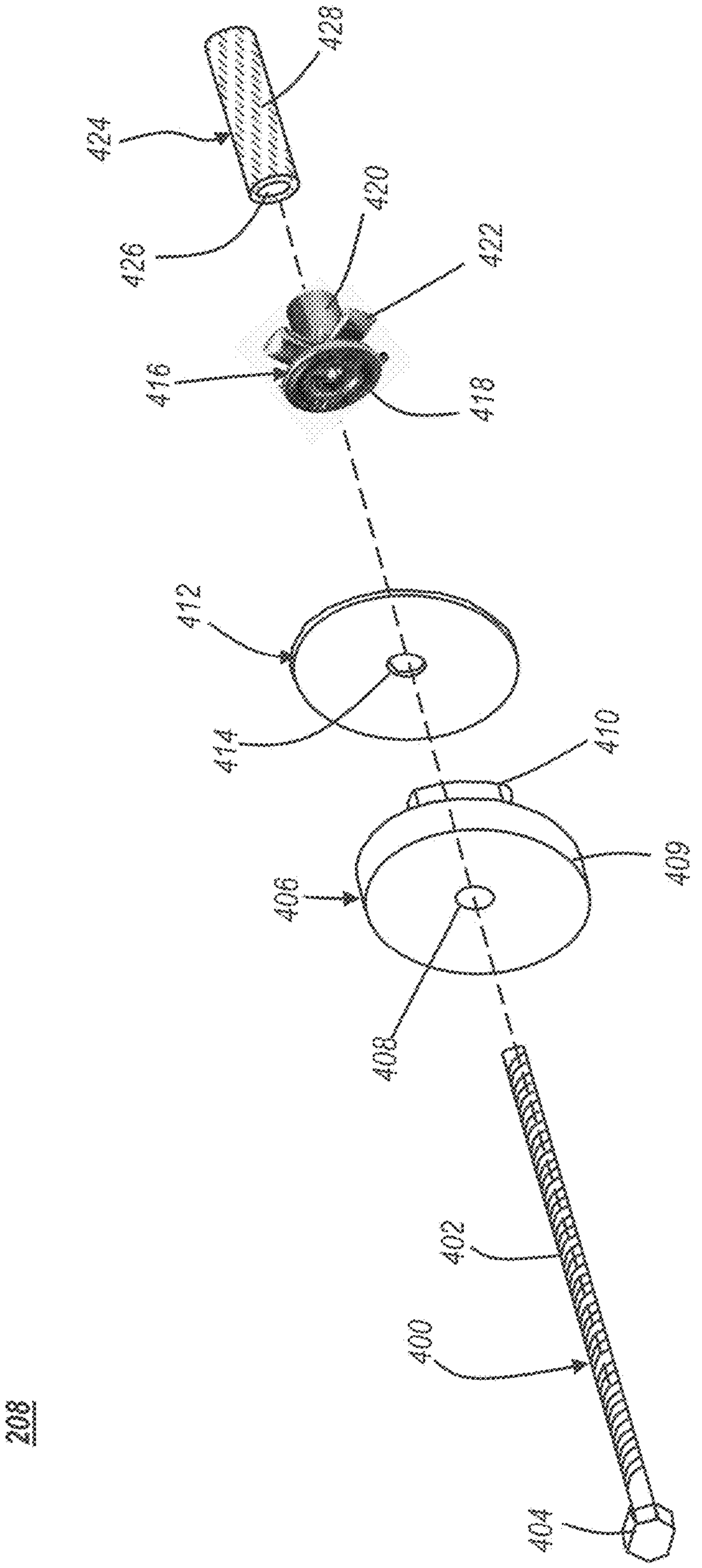
FIG. 4 shows an exploded view of a fastening unit for use in a flood barrier system, in accordance with some embodiments.

FIG. 4 shows an exploded view of a fastener unit 208 for use with the inventive flood panel barrier system support structure, in accordance with some embodiments. The fastener unit 208 includes a bolt 400 which can be a tap bolt. The bolt 400 includes a threaded shank 402 and a head 404 that can be a hex-head, as is well known. An adjustment knob 406 has a threaded through-hole 408 to allow the adjustment knob 406 to thread onto the shank 402 of the tap bolt 400. The main body 409 is puck-shaped and can be knurled or fluted around the outside edge to allow for turning the knob 406. The knob 406 further includes a standoff 410 that can also be puck-shaped, with have smaller diameter than the main body 409, and through which the threaded hole 408 also passes. The bottom of the standoff portion 410 of the knob 406 bears against a washer 412 to exert a compressive force, which has an opening 414 that is slightly larger than the outside diameter of the shank 402 of the bolt 400. Thus, the shank 402 can pass through the washer 412 without having to be threaded through the washer 412. The washer 412 can be a dock washer and have a diameter of about three inches in some embodiments. The bolt 400 can have a length of four to six inches, such as a ⅜"×4" tap bolt. The knob 406 and washer 412 are positioned on the outward facing side of the support structure so that personnel can easily access and tighten or loosen the knobs 406 of each fastener unit 208. The bolt shank 402 passes through support bracket, gasket, and/or the fabric panel, depending on where it is located. The distal end of the shank 402 threads into either a rivet nut 416 or an anchor 424, depending on the location of the fastening unit 208, and in some positions the distal end of the shank 402 can instead be threaded into an opposing knob 406. The rivet nut 416 includes a threaded body 420 into which the shank 402 is threaded. A flange 418 extends outward and acts like a washer. There is a collapsible portion 422 that collapses when the bolt is tightened while the flange 418 is bearing against a surface, causing sections of the collapsible portion 422 to collapse and extend outward. The anchor 424 can be a snake anchor and is intended to fit into a bore, such as a bore into the ground surface, and frictionally engage the sides of the bore so as to become stuck fast in the bore. This can occur, for example, by making the inner diameter of the axial bore 426 of the anchor 424 slightly smaller than the outside diameter of the shank 402 of the bolt 400, and the outside diameter of the body 428 of the anchor about the same as the diameter of the bore into which the anchor 424 is sunk. Thus, when the bolt 400 is threaded into the axial bore 426, it will force the body 428 outward against the wall of the bore in which the anchor 424 is sunk. Fastening units that secure the fabric panel to the vertical support members of the vertical portion of angled plates can be referred to as panel fastening units and use the rivet nut 316. Fastening unit that secure the horizontal portion of angled plates to the ground or throughway walls can be referred to a ground or plate fastening units and use an anchor 424.

Figure 7:
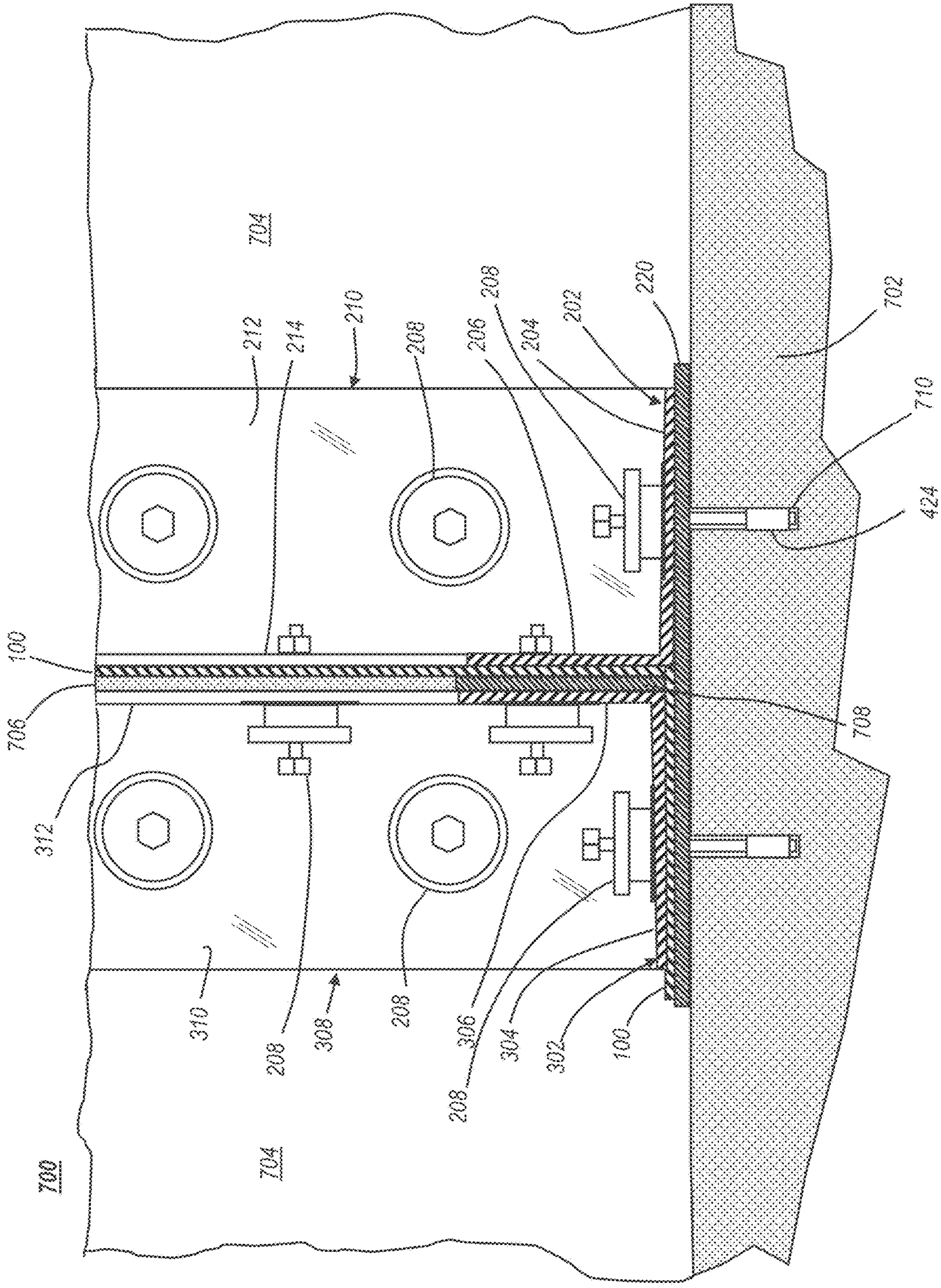
FIG. 7 shows a side sectional view detail of the flood barrier system, in accordance with some embodiments.
Figure 8:
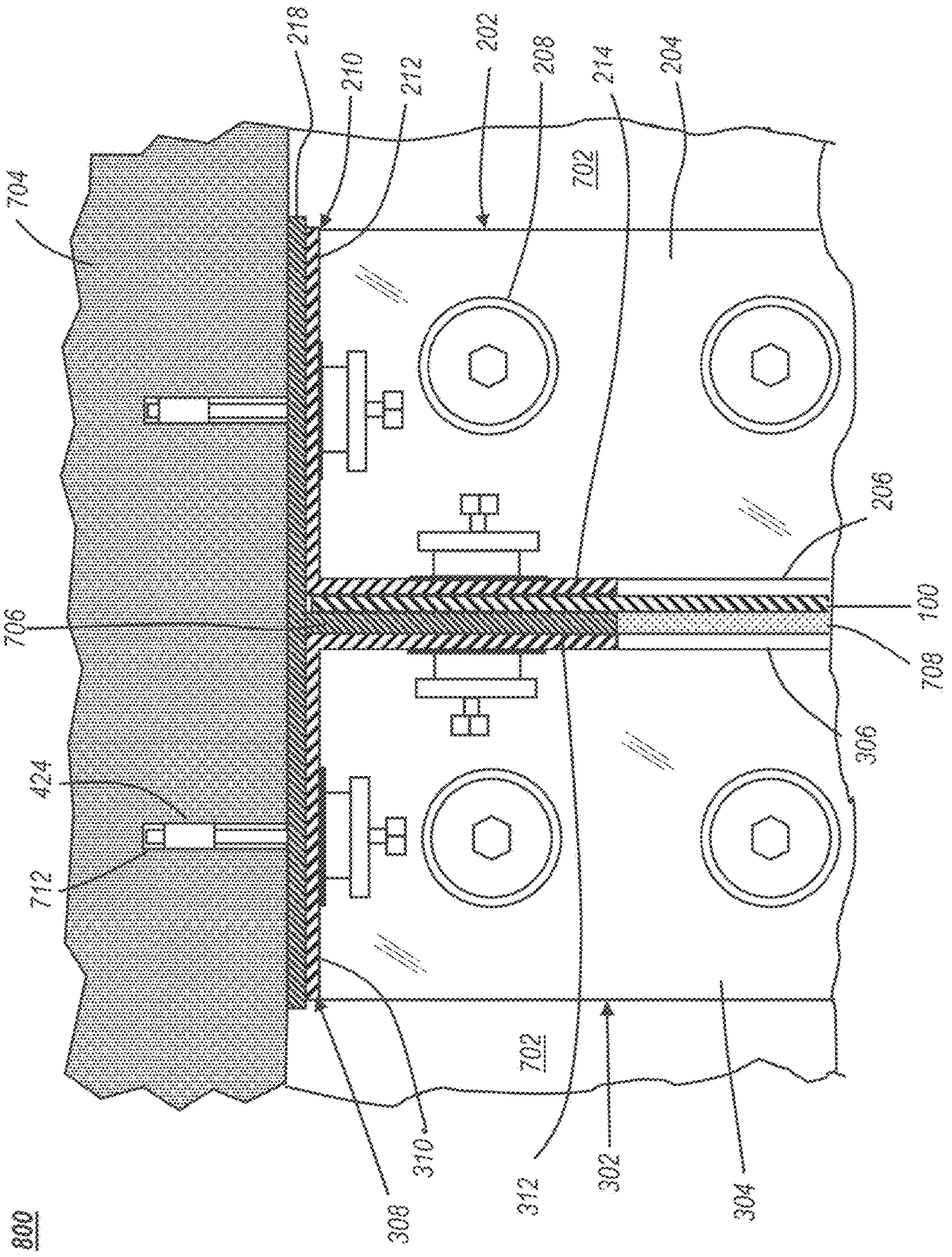
FIG. 8 shows a top sectional view detail of the flood barrier system, in accordance with some embodiments.

FIG. 7 shows a side sectional view detail 700 of the flood barrier system, in accordance with some embodiments. Similar to FIG. 6, the view detail 700 shows the lower portion of the barrier system. There is a ground surface 702, into which the bolts of fastening units 208 extend into anchors 424 embedded in bores 710 into the ground surface 702. The ground surface 702 is preferrable cementitious, such as concrete, or another suitable anchoring surface that will resist being pulled up in response to the force of water against the flood barrier system. The vertical angle brackets 210, 308 bear against a vertical surface 704. FIG. 8 shows top sectional view detail 800 with the section taken centrally in the horizontal direction. In FIG. 8, it can be seen that the vertical angle brackets 210, 308 bear against the vertical surface 704 with fastening units 208 mated with anchors 424 in bores 712 in the vertical surface 704. In FIG. 7, the bottom gasket 220 can be seen disposed between the anchor portions 204, 304 of the horizontal angle brackets 202, 302. In addition, there can be seen a vertical gasket 706 between the capture portions 214, 312 of the vertical angle brackets 210, 308, and a horizontal gasket 708 between the capture portions 206, 306 of the horizontal angle brackets 202, 302. Either the horizontal gasket 708 can extend completely across the barrier system in the horizontal direction, with the vertical gaskets 706 on top at the side, and extending upwards, or the vertical gaskets 706 can extend to the ground or to the bottom gasket 220, with the horizontal gasket 708 between them. The arrangement of gaskets is such that they abut each other so that when compressed by the anchor portions, the gaskets also seal against each other.

The disclosed flood panel barrier system using a fabric panel that is lighter than prior art rigid flood panels, and can be easier to manufacture and store when not in use. The fabric panels, when folded, are generally no thicker than a conventional rigid flood panel, and being folded, take up much less space. This can allow the fabric flood panels to be stored in groups in boxes, for example. When deploying the barrier system, it is easier for one person to set up the barrier system. For example, vertical angle brackets 308 and side gaskets 218 can be set up against the opposing vertical surfaces, and the second horizontal right-angle bracket 302 and bottom gasket 220 can be set up on the ground surface. The anchor bores and anchors, having been previously placed, it is simply a matter of installing the fastening units to anchor the right-angle brackets 302, 308 in place. Then the vertical and horizontal gaskets 706, 708 can be placed, with fasting units extending through the capture portions 306, 312 of the anchored right-angle brackets 302, 308. Then the fabric panel can be installed, hanging the cable loops 315 on the top-most fastening units in the capture portion 310 of the vertical angle brackets 308. Then the reinforced openings 134 are each passed over the bolt of a respective fastening unit along the vertical and horizontal angle brackets 302, 308, at which point the fabric panel 100 is in place, and the opposing horizontal and vertical angle brackets 202, 210 can be installed, capturing the fabric panel 100 and gaskets 706, 708 between the corresponding capture portions 206, 306, and 214, 312. Once the angle brackets 202, 210 are in place, further fastening units 208 are installed to anchor angle brackets 202, 210, and then the fastening units 208 in the capture portions 206, 306 and 214, 312 can be tightened to compress the gaskets 706, 708 and seal the barrier system. Top cap 216 can also be installed during or after this process.

Figure 9:
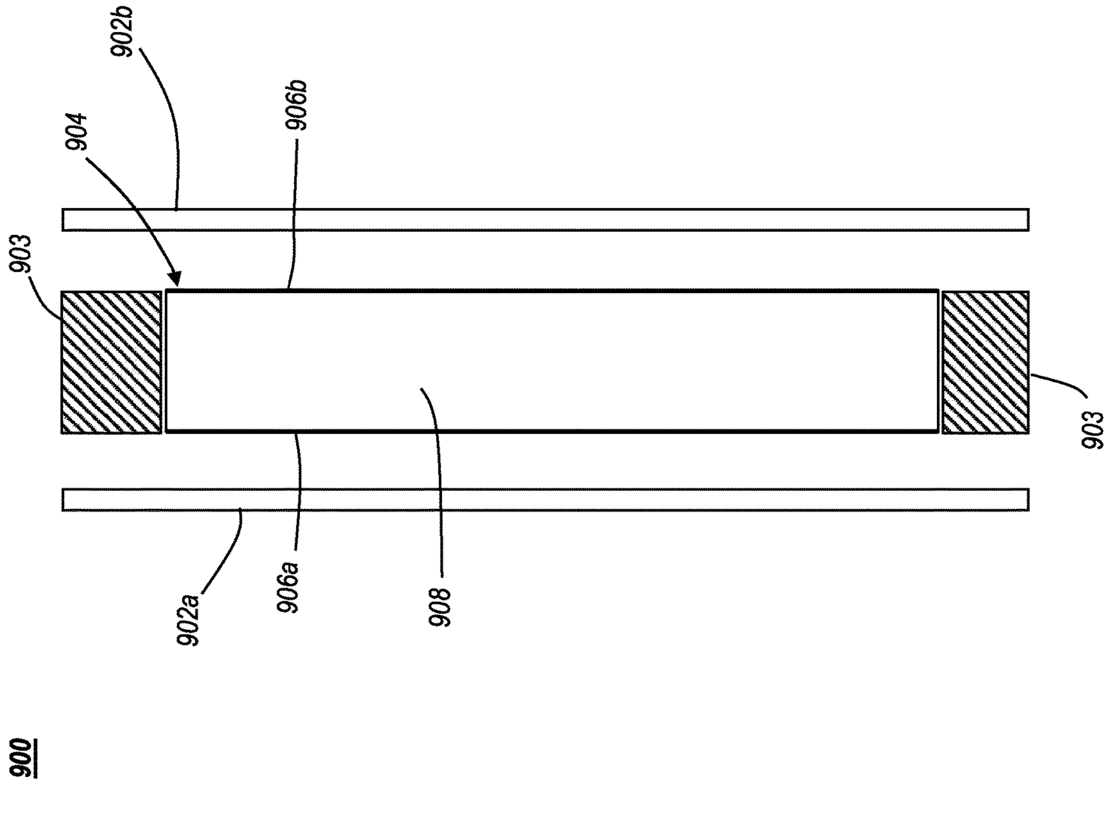
FIG. 9 is an exploded cross section view of a flood panel for a flood barrier system having a lightweight hexagonal cell core, in accordance with some embodiments.
Figure 10:
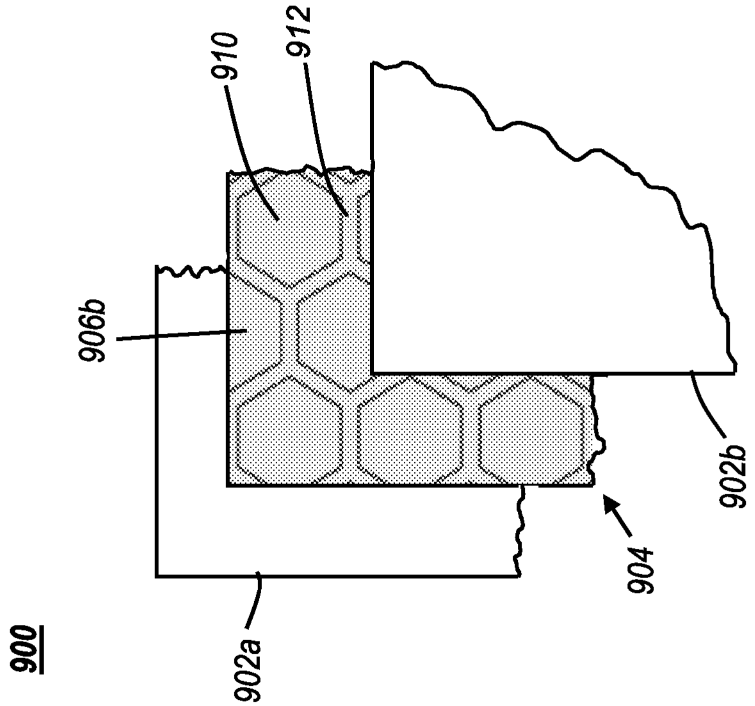
FIG. 10 shows an exploded assembly view of a flood panel for a flood barrier system, in accordance with some embodiments.
Figure 11:
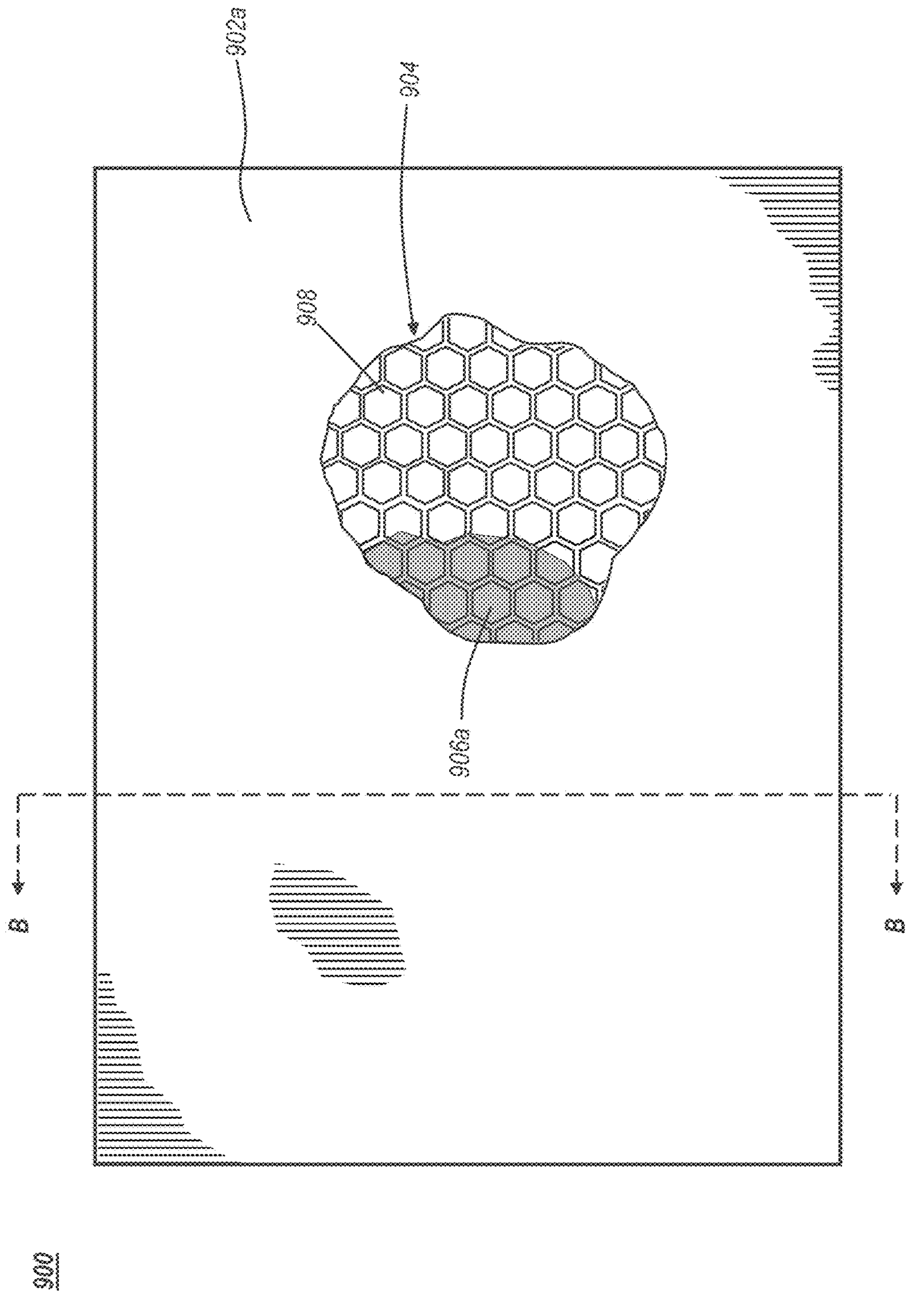
FIG. 11 shows a side view of flood panel for a flood barrier system, with a portion of the side surface removed to reveal the core of the panel, in accordance with some embodiments.

FIG. 9 is an exploded cross section view of a flood panel 900 for a flood barrier system having a lightweight hexagonal cell core 904, in accordance with some embodiments. The view of FIG. 9 is taken along section line B-B as shown in FIG. 11. The panel 900 is generally a planar panel having a thickness of about one to three inches in most applications, a height of four to eight feet, and a width of two to eight feet. Other dimensions that may be larger or smaller than these general dimensions can be used for particular applications. The panel 900 is constructed as a laminate including sides 902*a* and 902*b*, with a core 904 disposed between the sides 902*a*, 902*b* within a frame 903. The core 904 includes a cell core 908 that includes regular openings through the core that are bounded by walls that extend the thickness of the core 904. On each side of the cell core 908 there are skins 906*a*, 906*b* to cover the cell core 908 and exclude any matter from the cells 910. In FIG. 10 the core 904 is seen from a side view in detail. The skin 906*b* is shown here as being transparent so that the cells 910 and walls 912 of the cell core 908 can be seen. The cells 910 are regularly shaped, and can be hexagonal, providing a "honeycomb" pattern. Other shapes can be used in some applications. The cells 910 is voids between the skins 906*a*, 906*b* that are bounded by the walls 912. The walls 912 are made of a composite material such as, for example, a plastic or other polymeric material, and the walls 912 can be reinforced with, for example, fiberglass, in some applications. The cells 910 generally have an opening size, from one wall to the opposing wall of the cell, of about eight millimeters in some embodiments, or one half inch to two inches in some embodiments. The opening size can depend on the thickness of the core 904. The cell walls 912 can have a width of about one quarter inch to three quarters of an inch in some embodiments, but can be larger or smaller depending on the application, cell opening size, and core thickness. The outer sides 902*a*, 902*b* are fiberglass, which includes woven glass fibers in a cured resin. The sides 902*a*, 902*b* can have a thickness of about one sixteenth to one eights of an inch in some embodiments. The cell core 908 can be made up of polypropylene cells. The skins 906*a*, 906*b* can be comprised of an inner plastic film that seals the cells on each side of the cells. The plastic film can be bonded to an outer layer that can be a non-woven polyester, which provides a good adhesion surface for bonding to the sides 902*a*, 902*b*. The frame 903 surrounds the core 904 and can be a composite material such as that typically used as the core in a flood panel. For example, the frame can be made of foam having a density of 80-130 $Kg/M^3$. In some embodiments the frame can be made of metal or square metal tubing, such as steel or aluminum. The frame 903 provides structural support for the fastening units that are used to hold the panel to other structure in the flood barrier system. Holes are drilled through the panel near the edges, and through the frame, so that bolts of the fastening units can pass through the panel.

FIG. 11 shows a side view of flood panel 900 for a flood barrier system, with a portion of the side surface 902*a* removed to reveal the core 904 of the panel 900, in accordance with some embodiments. The side surface 902*a* forms one of the major planar surfaces of the panel, opposite side surface 902*b*, and the core 904 is "sandwiched" between the side surfaces 902*a*, 902*b*. The opening in side surface 902*a*, which is only shown to reveal the core 904 and would not actually be present in a flood panel 900 used for a flood barrier, also reveals skin 906*a* of the core 904 over the cell core 908. It has been found that the use of the cell core provides a better deflection resistance than a standard solid foam core, as well.

Figure 12:
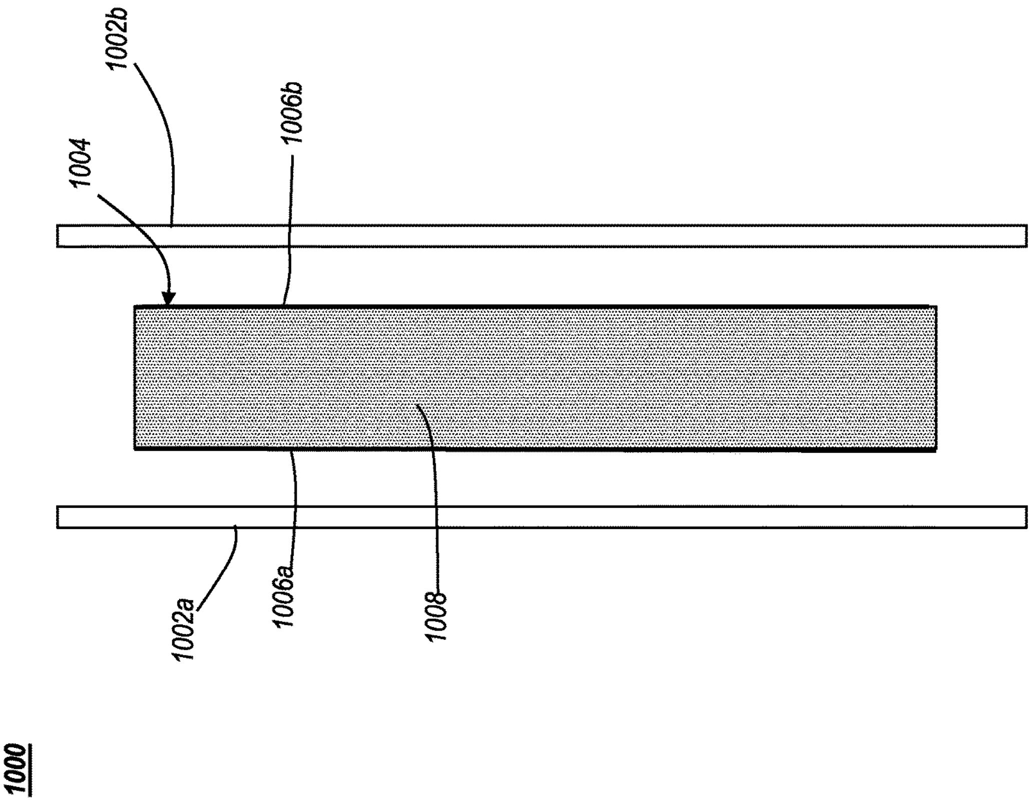
FIG. 12 is an exploded edge view of a flood panel for a flood barrier system having a lightweight laminate core, in accordance with some embodiments.

FIG. 12 is an exploded edge view of a flood panel 1000 for a flood barrier system having a lightweight laminate core, in accordance with some embodiments. In this view the frame (e.g. 903) is not shown, but would be included in the panel. The panel 1000 is generally a planar panel having a thickness of about one to three inches in most applications, a height of four to eight feet, and a width of two to eight feet. Other dimensions that may be larger or smaller than these general dimensions can be used for particular applications. The panel 1000 is constructed as a laminate including sides 1002*a* and 1002*b*, with a core 1004 disposed between the sides 1002*a*, 1002*b*. The core 1004 includes a laminate foam core 1008 that is made of a fiber-reinforced closed cell foam core. Specifically, it is a closed cell polyurethane foam that is reinforced with woven fiberglass layers that are parallel with the sides 1002*a*, 1002*b*. The core 1004 can have skins 1006*a*, 1006*b* to exclude matter and provide an additional water barrier, but the skins 1006*a*, 1006*b* can also be omitted or that only the laminate foam core 1008 is present. The core 1008 is preferably constructed so that there is fiberglass continuously distributed throughout the closed cell foam. The outer sides 1002*a*, 1002*b* can be substantially identical to sides 902*a*, 902*b*, and are fiberglass, which includes woven glass fibers in a cured resin. The sides 1002*a*, 1002*b* can have a thickness of about one sixteenth to one eights of an inch in some embodiments.

Figure 13:
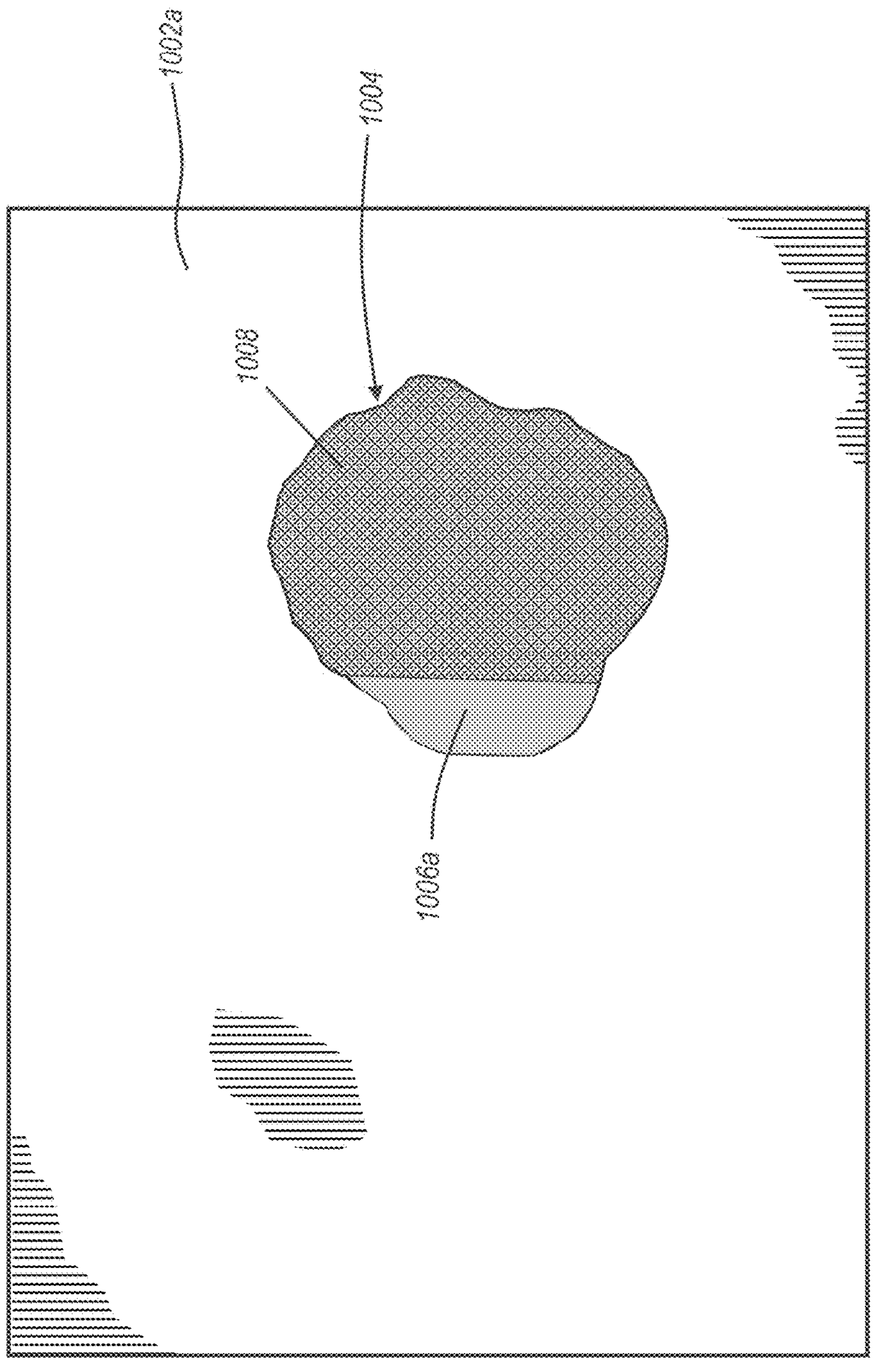
FIG. 13 shows a side view of flood panel for a flood barrier system, with a portion of the side surface removed to reveal the core of the panel, in accordance with some embodiments.

FIG. 13 shows a side view of flood panel 1000 for a flood barrier system, with a portion of the side surface 1002*a* removed to reveal the core 1004 of the panel 900, in accordance with some embodiments. The side surface 1002*a* forms one of the major planar surfaces of the panel, opposite side surface 1002*b*, and the core 1004 is "sandwiched" between the side surfaces 1002*a*, 1002*b*. The opening in side surface 1002*a*, which is only shown here to reveal the core 204, would not actually be present in a flood panel 1000 used for a flood barrier.

Figure 14:
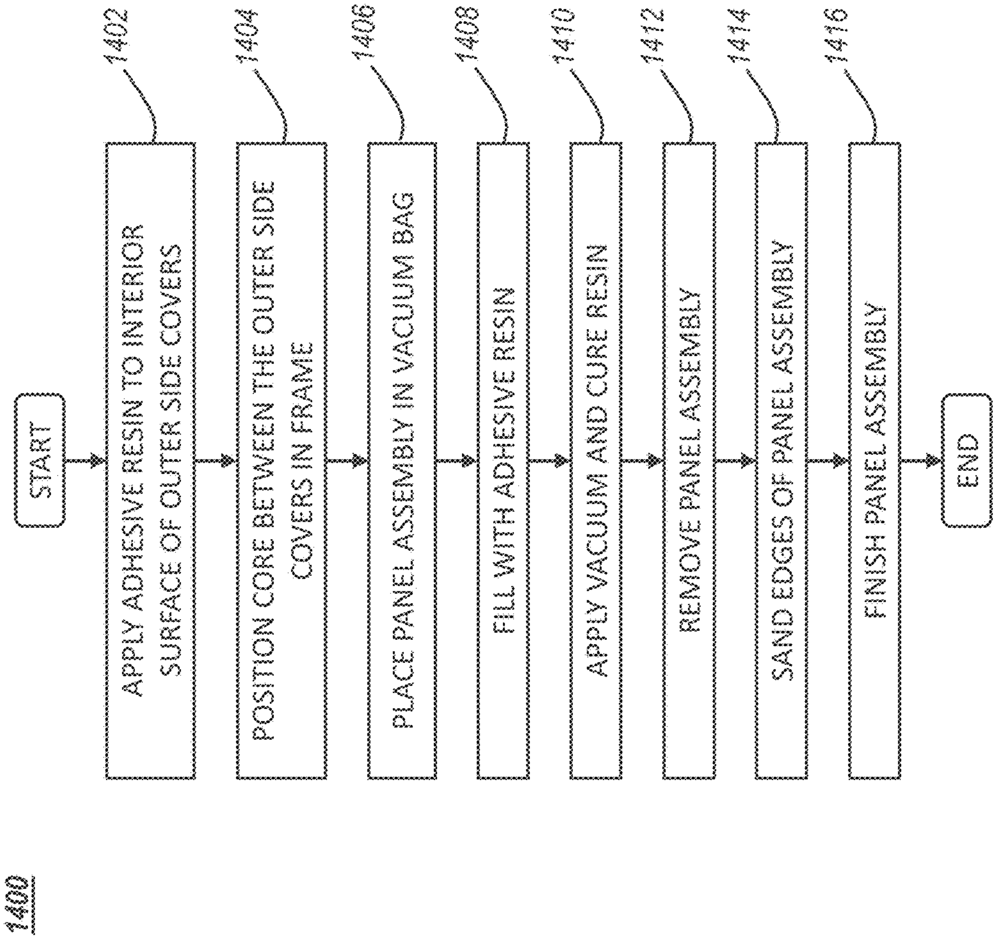
FIG. 14 show a flow chart diagram of a method of making lightweight flood panels, in accordance with some embodiments.

FIG. 14 show a flow chart diagram of a method 1400 of making lightweight flood panels, in accordance with some embodiments. The method 1400 can be used to form panel 900. At the start of the method 1400, the various materials for a given panel are collected and ready for assembly. In step 1402 an adhesive resin is applied to the inner surfaces of the sides 902*a*, 902*b* or 1002*a*, 1002*b*. The core, either the cell core 904 or laminate foam core 204, is then placed between the sides 902*a*, 902*b* or 1002*a*, 1002*b* in a sandwich arrangement with the core between the two sides in step 1404. This assembly is then placed in a vacuum bag in step 1406. Additional adhesive resin is added into the vacuum bag in step 1408. This can be the same adhesive resin used in step 1402 or another adhesive resin. The adhesive resin provided in step 1408 fills in the edges of the panel. In step 1410 a vacuum is applied to the interior of the vacuum bag with the panel assembly therein, and the adhesive resins are allowed to cure. In step 1412 the cured panel assembly is removed from the vacuum bag. In step 1414 the edges of the cured panel assembly are then sanded or otherwise ground to form even edges. In step 1416 the panel can be finished with any coatings that may be applied, and holes can be drilled through the panel, from side to side, for fasteners that will hold the panel in place when the panel is deployed in a flood barrier system. The method 1400 then ends for the respective panel and can be repeated for creating other panels. In method 1400, in some embodiments a frame can be used to hold the core. However, it is also contemplated that the core can extend to the edges of the panel, such as when using core 1004, or when the edges of the cell core 904 are processed by filling cells along the edges with resin or foam of a sufficient density to support bores for fasteners. Cells within the distance 1606 of FIG. 16 from the edges of the panel assembly can be filled. In some embodiments the frame can be an assembly including metal plates on each side of a foam member, where the plates and the foam member are rectangular and define a void in which a core can be placed. Thus, the two plate member can sandwich the foam member between them, with that subassembly being disposed between the sides.

Figure 15:
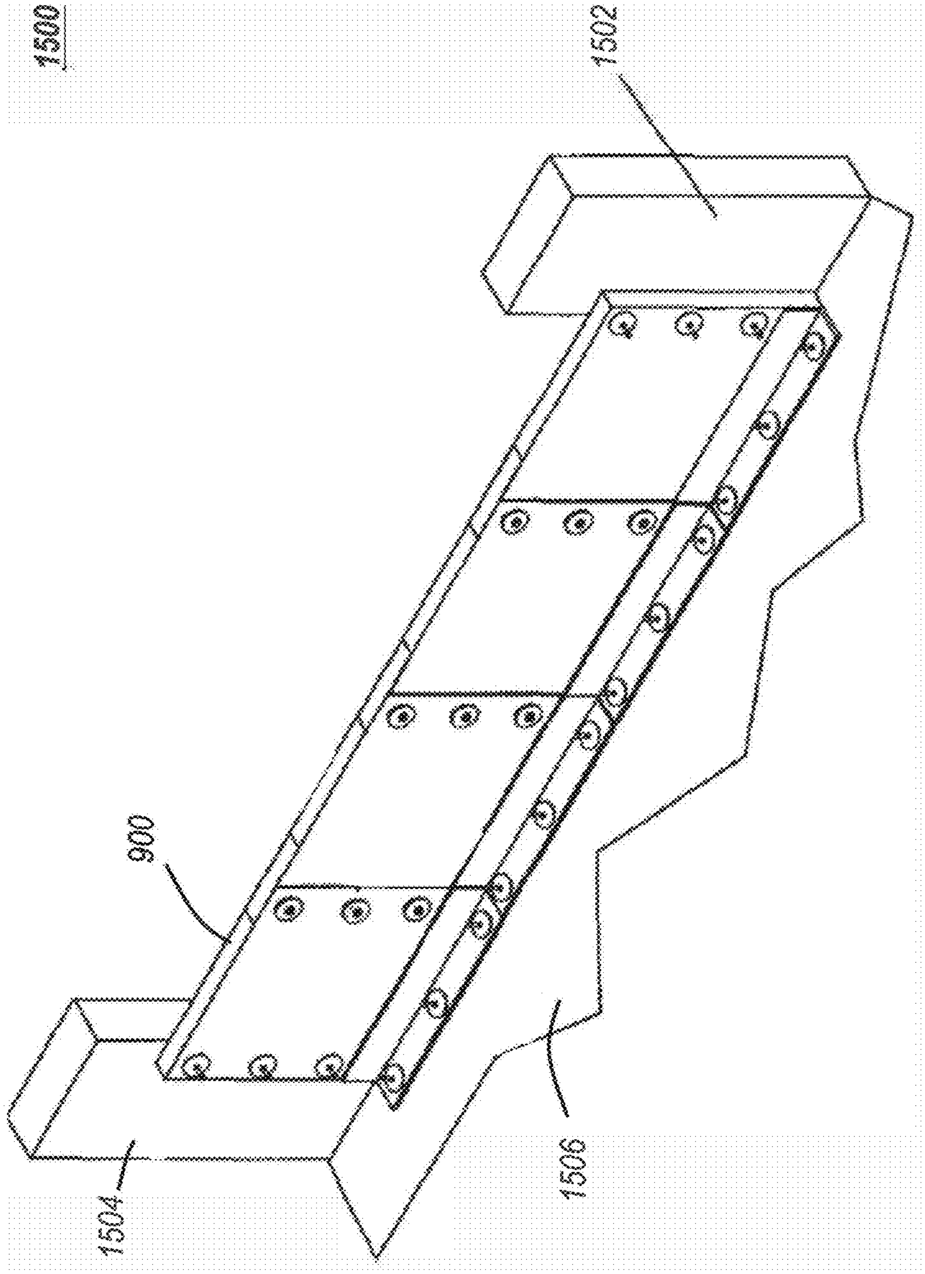
FIG. 15 shows a perspective view of a flood barrier system using lightweight flood panels, in accordance with some embodiments.

FIG. 15 shows a perspective view of a flood barrier system 1500 using lightweight flood panels 900, in accordance with some embodiments. The panels 900 form a barrier across a gap between two structures 1502, 1504, which can be portions of adjacent buildings. The panels 900 are connected to the ground surface 1506 in a series between the two structures 1502, 1504. Examples of fastening systems can be found, for example, in U.S. Pat. No. 12,203,323, the disclosure of which is hereby incorporated by reference.

Figure 16:
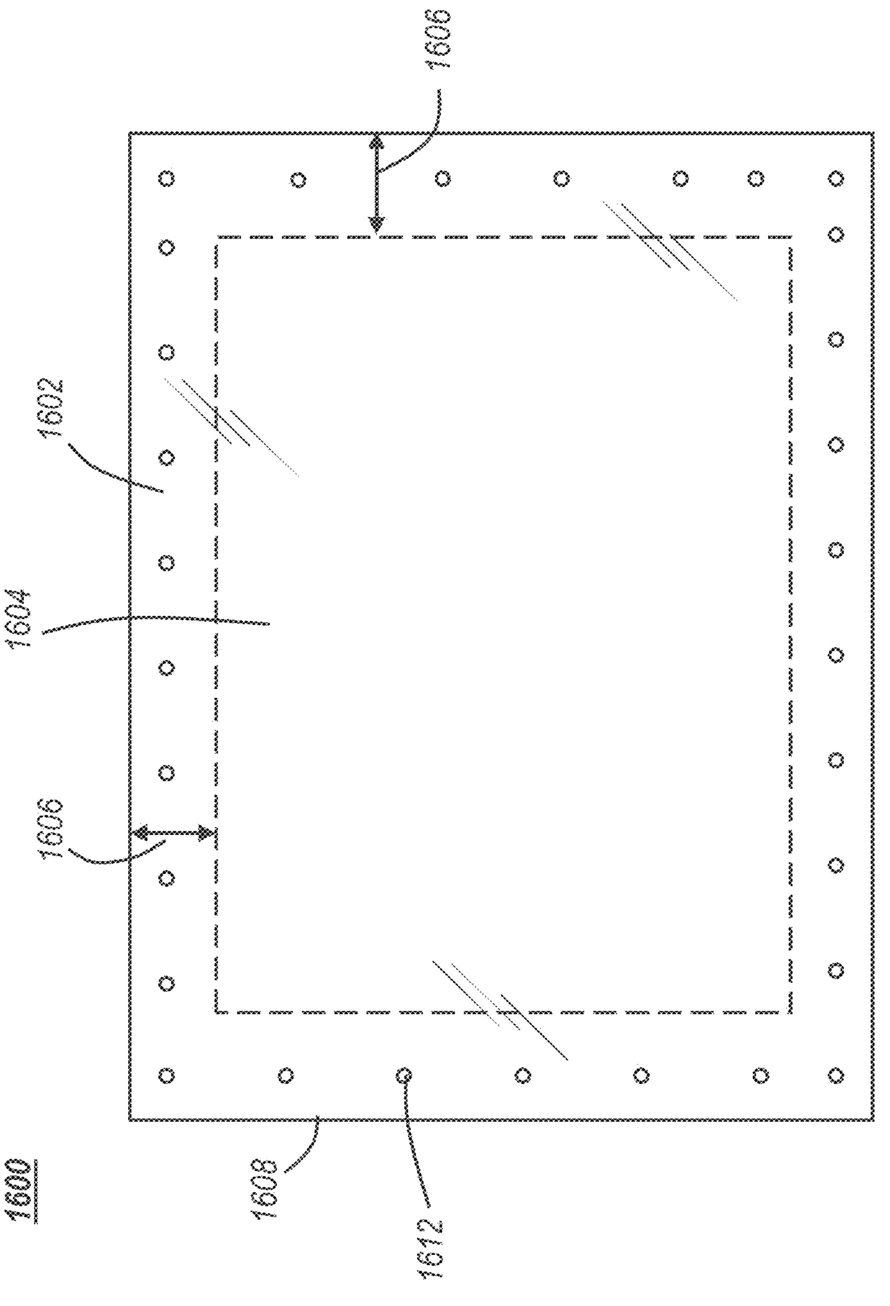
FIG. 16 shows a side view of a flood panel indicating the relative location of the lightweight core and the frame surrounding the core, in accordance with some embodiments.
Figure 17:
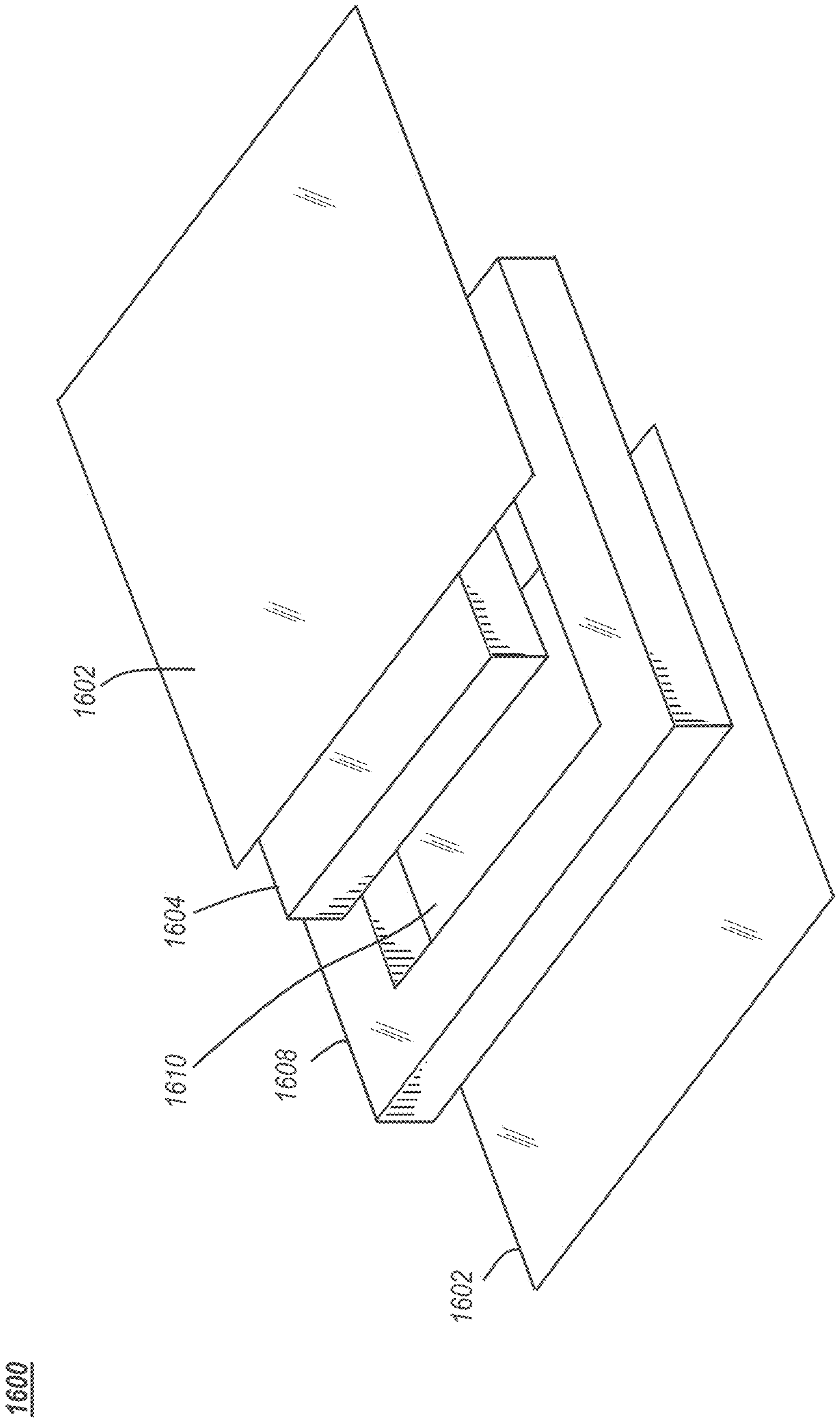
FIG. 17 shows a perspective exploded view of a lightweight flood panel, in accordance with some embodiments.

FIG. 16 shows a side view of a flood panel 1600 indicating the relative location of the lightweight core and the frame surrounding the core, in accordance with some embodiments. FIG. 17 shows a perspective exploded view of a lightweight flood panel 1600. The relative dimensions shown here are exaggerated to make the construction clear and should not be taken as any indication of the relative dimensions of an actual flood panel. The panels 1600 can be panel 900, or some other similar construction. The panel 1600 includes sides 1602 (e.g. sides 902*a*, 902*b*, 1002*a*, 1002*b*), a core 1604 such as a cell core 904 or a laminate foam core 204. The core 1604 is surrounded by a frame 1608 (e.g. frame 903). There is a void 1610 in the frame that is sized to receive the core 1604 therein. The frame surrounds the core and extends from the edges into the panel by a distance 1606 that is on the order of several inches. In some embodiments the frame 1608 has a width 1606 of about six inches. In the manufacture of the panel, using method 1400, for example, resin can be provided in the gaps between the core and the frame. When the core 1604 is a cell core (e.g. 904), the edges of the core will be irregular, and not flat, due to the nature of the cells and cutting the material of the core to fit into the frame. Once the panel is finished, holes 1612 can be drilled around the panel 1600 adjacent the edges of the panel 1600 for the fastening units.

A lightweight panel construction has been disclosed for lightweight flood panels for flood barrier systems in which the panels have a lightweight core. In some embodiments the core is a cell core including open cells in a regular pattern that provides voids between the two sides of the panel, internally to the panel. In some embodiments, the core is a laminate loam core that is comprised of layers of fiberglass in a cured closed cell foam such that the fiberglass is continuously distributed throughout the closed cell foam. These cores result in flood panels that are significantly lighter than conventional flood panels, and provide equivalent rigidity and resistance to impact as conventional panels. It has been found that the use of the cell core provides a better deflection resistance than a standard solid foam core, as well.

What is claimed is:

1. A flood panel for a flood barrier system, comprising:
- a frame defining a central void, the frame extending around a perimeter of the flood panel and configured to provide structural support, wherein the frame is formed of metal;
- a core disposed within the central void of the frame;
- a first side and a second side, each formed of fiberglass comprising woven glass fibers in a cured resin, the first side and the second side being substantially parallel and spaced apart to cover the frame and the core, defining a thickness of the flood panel;
- wherein the core comprises a cell core having a plurality of regularly shaped cells bounded by walls extending through a thickness of the core, the cells being voids, and the core further comprising skins on opposing sides of the cell core to cover the cells.

2. The flood panel of claim 1, wherein the cells are hexagonal in shape, forming a honeycomb pattern.

3. The flood panel of claim 1, wherein the walls of the cell core are formed of a polymeric material.

4. The flood panel of claim 3, wherein the polymeric material is polypropylene.

5. The flood panel of claim 1, wherein the skins each comprise an inner plastic film bonded to the cell core and an outer non-woven polyester layer bonded to the inner plastic film.

6. The flood panel of claim 1, wherein each cell has an opening size from one wall to an opposing wall of about eight millimeters to two inches.

7. The flood panel of claim 1, wherein the frame has a width of about six inches extending inward from edges of the flood panel.

8. The flood panel of claim 1, further comprising a plurality of holes drilled through the frame and the first and second sides adjacent edges of the flood panel for receiving fastening units.

9. A method of making a flood panel for a flood barrier system, comprising:
- providing a frame defining a central void;
- positioning a core within the central void of the frame;
- applying an adhesive resin to inner surfaces of a first side and a second side, wherein the first side and the second side are each formed of fiberglass comprising woven glass fibers in a cured resin;
- placing the first side and the second side over the frame and the core in a sandwich arrangement;
- placing the sandwich arrangement in a vacuum bag;
- adding additional adhesive resin into the vacuum bag to fill edges and gaps;
- applying a vacuum to an interior of the vacuum bag and allowing the adhesive resin and the additional adhesive resin to cure, forming a cured panel assembly;
- removing the cured panel assembly from the vacuum bag; and
- finishing edges of the cured panel assembly.

10. The method of claim 9, further comprising drilling a plurality of holes through the frame and the first and second sides adjacent edges of the flood panel for receiving fastening units.

11. A flood panel for a flood barrier system, comprising:
- a frame defining a central void, the frame extending around a perimeter of the flood panel and configured to provide structural support;
- a core disposed within the central void of the frame;
- a first side and a second side, each formed of fiberglass comprising woven glass fibers in a cured resin, the first side and the second side being substantially parallel and spaced apart to cover the frame and the core, defining a thickness of the flood panel;
- wherein the core comprises a cell core having a plurality of regularly shaped cells bounded by walls extending through a thickness of the core, the cells being voids, and the core further comprising skins on opposing sides of the cell core to cover the cells, wherein the skins each comprise an inner plastic film bonded to the cell core and an outer non-woven polyester layer bonded to the inner plastic film.

12. The flood panel of claim 11, wherein the cells are hexagonal in shape, forming a honeycomb pattern.

13. The flood panel of claim 11, wherein the walls of the cell core are formed of a polymeric material.

14. The flood panel of claim 13, wherein the polymeric material is polypropylene.

15. The flood panel of claim 11, wherein each cell has an opening size from one wall to an opposing wall of about eight millimeters to two inches.

16. The flood panel of claim 11, wherein the frame is formed of a foam material having a density of about 80 to 130 $kg/m^3$.

17. The flood panel of claim 11, wherein the frame has a width of about six inches extending inward from edges of the flood panel.

18. The flood panel of claim 11, further comprising a plurality of holes drilled through the frame and the first and second sides adjacent edges of the flood panel for receiving fastening units.

* * * * *